(12) United States Patent
Huang et al.

(10) Patent No.: US 11,894,890 B2
(45) Date of Patent: *Feb. 6, 2024

(54) COMMUNICATION DEVICE AND COMMUNICATION METHOD

(71) Applicant: Panasonic Intellectual Property Corporation of America, Torrance, CA (US)

(72) Inventors: Lei Huang, Singapore (SG); Hiroyuki Motozuka, Kanagawa (JP); Takenori Sakamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,211

(22) Filed: Sep. 27, 2022

(65) Prior Publication Data

US 2023/0016720 A1 Jan. 19, 2023

Related U.S. Application Data

(63) Continuation of application No. 17/049,231, filed as application No. PCT/JP2019/016885 on Apr. 19, 2019, now Pat. No. 11,489,564.

(Continued)

(30) Foreign Application Priority Data

Apr. 16, 2019 (JP) .................. 2019-078100

(51) Int. Cl.
*H04B 7/0417* (2017.01)
*H04B 7/0452* (2017.01)
*H04B 7/06* (2006.01)

(52) U.S. Cl.
CPC ......... *H04B 7/0417* (2013.01); *H04B 7/0452* (2013.01); *H04B 7/0621* (2013.01)

(58) Field of Classification Search
CPC .. H04B 7/0417; H04B 7/0452; H04B 7/0621; H04B 7/0628; H04B 7/063;
(Continued)

(56) References Cited

U.S. PATENT DOCUMENTS

2016/0255660 A1* 9/2016 Son ...................... H04B 7/0619
370/329
2020/0204222 A1* 6/2020 Lou ...................... H04B 7/0695

FOREIGN PATENT DOCUMENTS

WO WO 2017123379 A1 7/2017

OTHER PUBLICATIONS

Claudio da Silva et al., "Resolution of MIMO BRP TXSS-related CIDs," IEEE 802.11-18/0089r0, *IEEE P802.11, Wireless LANs*, Jan. 13, 2018, 4 pages.
(Continued)

*Primary Examiner* — Fred A Casca
(74) *Attorney, Agent, or Firm* — Seed IP Law Group LLP

(57) ABSTRACT

According to a communication method of the present disclosure, a responder, after the end of transmission sector sweep (TXSS), receives from an initiator a first feedback frame including a BF training type FIELD indicating whether or not to implement a beam forming training (BFT) of a single user multi-input multi-output (SU-MIMO). If the BF training type FIELD indicates that a BFT of the SU-MIMO is to be implemented, the responder transmits to the initiator a second feedback frame based on the result of the TXSS and including a signal to noise ratio (SNR) and a sector identifier (ID) order. The initiator implements the BFT of the SU-MIMO between the initiator and the responder on the basis of the SNR and the sector ID order.

20 Claims, 26 Drawing Sheets

Related U.S. Application Data

(60) Provisional application No. 62/661,538, filed on Apr. 23, 2018.

(58) Field of Classification Search
CPC .. H04B 7/0695; H04B 7/0408; H04B 7/0491; H04B 7/0617; H04B 7/0619; H04B 7/0634; H04B 7/0413
See application file for complete search history.

(56) References Cited

OTHER PUBLICATIONS

Extended European Search Report dated May 27, 2021, for the corresponding European Patent Application No. 19792468.1, 9 pages.

IEEE, "IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 3: Enhancements for Very High Throughput in the 60 GHz Band," IEEE Std 802.11ad™-2012, IEEE Computer Society, Dec. 28, 2012, 628 pages.

International Search Report, dated Jul. 2, 2019, for corresponding International Application No. PCT/JP2019/016885, 4 pages.

Huang et al., Panasonic, Intel, Qualcomm, MediaTek, "Comment Resolution on the SISO phase of SU/MU-MIMO BF," IEEE 802.11-17/1234r1, IEEE P802.11, Sep. 2017, 7 pages.

Huang et al., Panasonic Corporation, MediaTek, "Draft Spec Text for Frame Formats related to SU and MU MIMO Beamforming," doc.: IEEE 802.11-16/1611r0, IEEE P802.11, Dec. 2016, 15 pages.

Lei Huang, Panasonic, "Comment Resolution on MIMO BF Misc," IEEE 802.11-18/0299r1, IEEE P802.11, Feb. 2018, 12 pages.

Lei Huang, "CR on EDMG Channel Measurement Feedback," IEEE 802.11-18/0430r2, *IEEE P802.11, Wireless LANs*, Mar. 6, 2018, 5 pages.

Lei Huang et al., "SU-MIMO beamforming optimization," IEEE 802.11-17/1233r1, IEEE P802.11, Wireless LANs, Dec. 6, 2017, 8 p.

\* cited by examiner

In SU-MIMO SISO Feedback procedure

| Initiator BRP frame 812 | <fields> | DMG Beam Refinement element | Channel Measurement Feedback element | EDMG Channel Measurement Feedback element |
|---|---|---|---|---|
| | | 10 octet | 1 or more | 1 or more |

| Responder BRP frame 813 | <fields> | DMG Beam Refinement element | Channel Measurement Feedback element | EDMG Channel Measurement Feedback element |
|---|---|---|---|---|
| | | 10 octet | 1 or more | 1 or more |

FIG. 10C

In MU-MIMO SISO Feedback procedure

| Initiator BRP frame 911a | <fields> | DMG Beam Refinement element |
|---|---|---|
| | | 10 octet |

| Responder BRP frame 912a | <fields> | DMG Beam Refinement element | Channel Measurement Feedback element | EDMG BRP Request element | EDMG Channel Measurement Feedback element |
|---|---|---|---|---|---|
| | | 10 octet | 1 or more | | 1 or more |

FIG. 10D

| Element name | Field name | Subfield name | SISO BRP with TXSS sector list feedback Initiator BRP frame 601 | SISO BRP with TXSS sector list feedback Responder BRP frame 602 | SISO BRP TXSS setup phase Initiator BRP frame 701 | SISO BRP TXSS setup phase Responder BRP frame 702 | MIMO BRP TXSS setup phase Initiator BRP frame 801 | MIMO BRP TXSS setup phase Responder BRP frame 802 | SU-MIMO SISO Feedback procedure Initiator BRP frame 812 | SU-MIMO SISO Feedback procedure Responder BRP frame 813 | MU-MIMO SISO Feedback subphase Initiator BRP frame 911a | MU-MIMO SISO Feedback subphase Responder BRP frame 912a |
|---|---|---|---|---|---|---|---|---|---|---|---|---|
| | Length | - | 5 | 5 | 8 | 8 | 8 | 8 | 8 | 8 | 8 | 8 |
| | TXSS-FBCK-REQ | - | 0/1 | 0/1 | 0/1 | 0/1 | 1 | 1 | 1 | 0 | 1 | 0 |
| | | SNR Requested | 1 | 0/1 | 1 | 1 | 1 | 0 | 1 | 0 | 1 | 0 |
| | | Sector ID Order Requested | 1 | 0/1 | 1 | 1 | 0 | 0 | 1 | 0 | 1 | 0 |
| | FBCK-REQ | Channel Measurement Requested | 0 | 0 | 0 | 0 | 0 | 0 | 0 | 0 | 0 | 0 |
| | | Number of Taps Requested | 0 | 0 | 0 | 0 | 0 | 0 | 0 | 0 | 0 | 0 |
| | | SNR Present | 0 | 1 | 0 | 0 | 0 | 0 | 1 | 1 | 0 | 1 |
| | | Sector ID Order Present | 0 | 1 | 0 | 0 | 0 | 0 | 1 | 1 | 0 | 1 |
| | FBCK-TYPE | Channel Measurement Present | 0 | 0 | 0 | 0 | 0 | 0 | 0 | 0 | 0 | 0 |
| | | Tap Delay Present | 0 | 0 | 0 | 0 | 0 | 0 | 0 | 0 | 0 | 0 |
| DMG Beam Refinement | | Link Type | 0 | 0 | 0 | 0 | 1 | 1 | 1 | 1 | 1 | 1 |
| | EDMG Extension Flag | - | Not present | Not present | 1 | 1 | 1 | 1 | 1 | 1 | 0 | 0 |
| | EDMG Channel Measurement Present | - | Not present | Not present | 0 | 0 | 0 | 0 | 0 | 0 | 0 | 0 |
| | BRP-TXSS | - | Not present | Not present | 1 | 1 | 1 | 1 | 0 | 0 | 0 | 0 |
| | TXSS-INITIATOR | - | Not present | Not present | 1 | 1 | 1 | 1 | Not present | Not present | Not present | Not present |
| | TXSS-MIMO | - | Not present | Not present | 0 | 0 | 1 | 1 | | | | |
| | L-TX-RX | - | Not present | Not present | >=0 | >0 | 0 | 0 | | | | >0 |
| | Requested EDMG TRN UNIT M | - | Not present | Not present | I.D. | I.D. | I.D. | I.D. | | | | I.D. |
| Channel Measurement Feedback | Sector ID Order, SNR, etc. | - | Not present | Not present | Not present | Not present | Not present | Not present | Present | Present | Not present | Present |
| EDMG Channel Measurement Feedback | EDMG Sector ID Order, BRP CDOWN, etc. | - | Not present | Not present | Not present | Not present | Not present | Not present | Present | Present | Not present | Present |

FIG. 11

COMMUNICATION DEVICE AND COMMUNICATION METHOD

TECHNICAL FIELD

The present disclosure relates to a communication apparatus and a communication method.

BACKGROUND ART

The IEEE802.11ay standard (referred to as "flay standard") has been developed as a system for achieving high-speed data transmission by applying a MIMO system to millimeter-wave communication (see Non-Patent Literatures (hereinafter, referred to as "NPLs") 2, 3, and 4).

CITATION LIST

Non-Patent Literature

NPL 1
IEEE802.11ad-2012
NPL 2
IEEE802.11-17/1233r1
NPL 3
IEEE802.11-18/0430r2
NPL 4
IEEE802.11-18/0089r0

SUMMARY OF INVENTION

There is a need to shorten the time taken to perform beamforming training (BFT) according to the 802.11ad standard (see PTL 1).

In a communication method according to one aspect of the present disclosure, an initiator transmits a first feedback frame to a responder, the first feedback frame including a BF training type FIELD indicating whether or not beamforming training (BFT) for Single User Multi-Input Multi-Output (SU-MIMO) is performed after transmission sector sweep (TXSS) ends; the responder receives the first feedback frame, and transmits second feedback frame to the initiator when the BF training type FIELD indicates that the BFT for SU-MIMO is performed, the second feedback frame including a Signal to Noise Ratio (SNR) and a sector Identifier (ID) order based on a result of the TXSS; and the initiator receives the second feedback frame, and performs the BFT for SU-MIMO between the initiator and the responder based on the SNR and the sector ID order.

In a communication method for an initiator according to one aspect of the present disclosure, the method including: transmitting a feedback frame to a responder, the feedback frame including a BF training type FIELD indicating whether or not BFT for SU-MIMO is performed after TXSS ends; and when second feedback frame including an SNR and a sector ID order based on a result of the TXSS is received from the responder, performing the BFT for SU-MIMO between the initiator and the responder based on the SNR and the sector ID order.

In a communication method for a responder according to one aspect of the present disclosure, the method including: receiving a first feedback frame from an initiator, the first feedback frame including a BF training type FIELD indicating whether or not beamforming training (BFT) for Single User Multi-Input Multi-Output (SU-MIMO) is performed after transmission sector sweep (TXSS) ends; transmitting second feedback frame to the initiator when the BF training type FIELD indicates that the BFT for SU-MIMO is performed, the second feedback frame including a Signal to Noise Ratio (SNR) and a sector Identifier (ID) order based on a result of the TXSS; and performing the BFT for SU-MIMO between the initiator and the responder based on the SNR and the sector ID order.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

The foregoing and other features of the present disclosure will become more fully apparent from the following description and appended claims, taken in conjunction with the accompanying drawings. With the understanding that these drawings only depict several embodiments according to the present disclosure and are therefore should not be considered as limiting the scope of the present disclosure, the disclosure is described more specifically and in more detail using the accompanying drawings.

BRIEF DESCRIPTION OF DRAWINGS

FIG. 10C illustrates a format of the BRP frame to be transmitted first when the communication apparatus performs the BFT procedure of FIG. 3, 4, 5, 6, 7, or 8;

FIG. 10D illustrates a format of the BRP frame to be transmitted first when the communication apparatus performs the BFT procedure of FIG. 3, 4, 5, 6, 7, or 8;

FIG. 11 illustrates a format of the BRP frame to be transmitted first when the communication apparatus performs the BFT procedure of FIG. 3, 4, 5, 6, 7, or 8;

DESCRIPTION OF EMBODIMENTS

Figure 1:
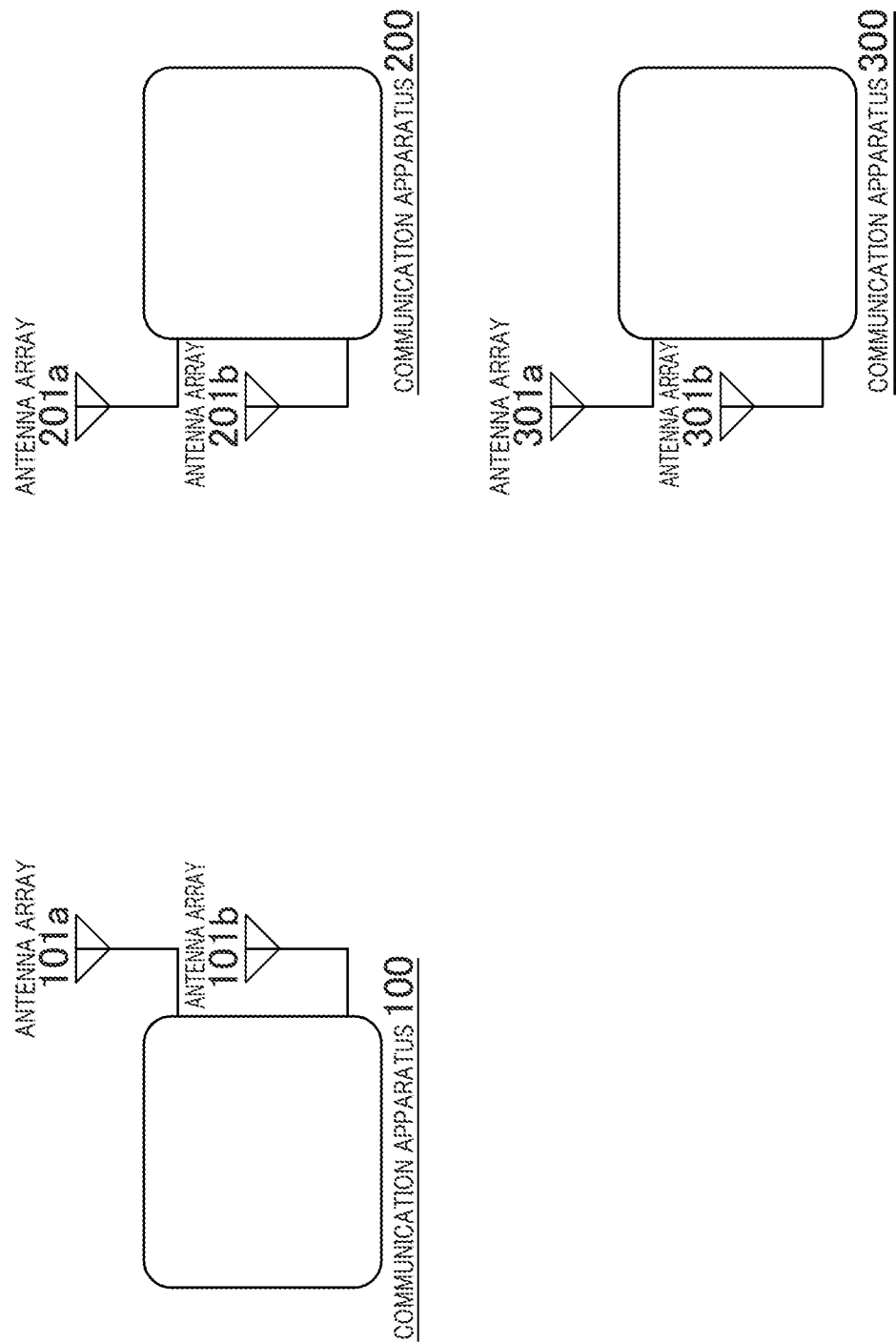
FIG. 1 illustrates an exemplary configuration of a MIMO communication system according to Embodiment 1.

In the following detailed description, reference is made to the accompanying drawings, which are incorporated in the description. In the drawings, like numerals generally identify like components, unless context dictates otherwise. It is readily understood that aspects of the present disclosure can be arranged, replaced, mixed, and designed in a wide variety of different configurations, all of which are explicitly expected and form a part of the present disclosure.

A beamforming training (BFT) procedure according to the 802.11ad standard (see NPL 1) will be described with reference to the drawings.

FIG. 1 illustrates an exemplary configuration of a MIMO communication system according to the present embodiment. Communication apparatus 100, communication apparatus 200, and communication apparatus 300 include one or more antenna arrays. Each of the antenna arrays includes one or more antenna elements.

Communication apparatus 100 includes two antenna arrays 101a and 101b, for example, and performs Single Input Single Output (SISO) communication with communication apparatus 200 and communication apparatus 300 by using one of the antenna arrays (e.g., antenna array 101a).

Communication apparatus 100 also performs Single User Multi-Input Multi-Output (SU-MIMO) communication with communication apparatus 200 and communication apparatus 300 by using a plurality of antenna arrays (e.g., antenna arrays 101a and 101b).

Communication apparatus 100 also performs Multi User-MIMO (MU-MIMO) communication with communication apparatus 200 and communication apparatus 300 using a plurality of antenna arrays (e.g., antenna arrays 101a and 101b). The communication apparatus communicates with one communication apparatus (e.g., one of communication apparatus 200 and communication apparatus 300) at the same time point (one transmission frame) in SU-MIMO, whereas the communication apparatus communicates with a plurality of communication apparatuses (e.g., both of communication apparatus 200 and communication apparatus 300) in MU-MIMO.

Figure 2A:
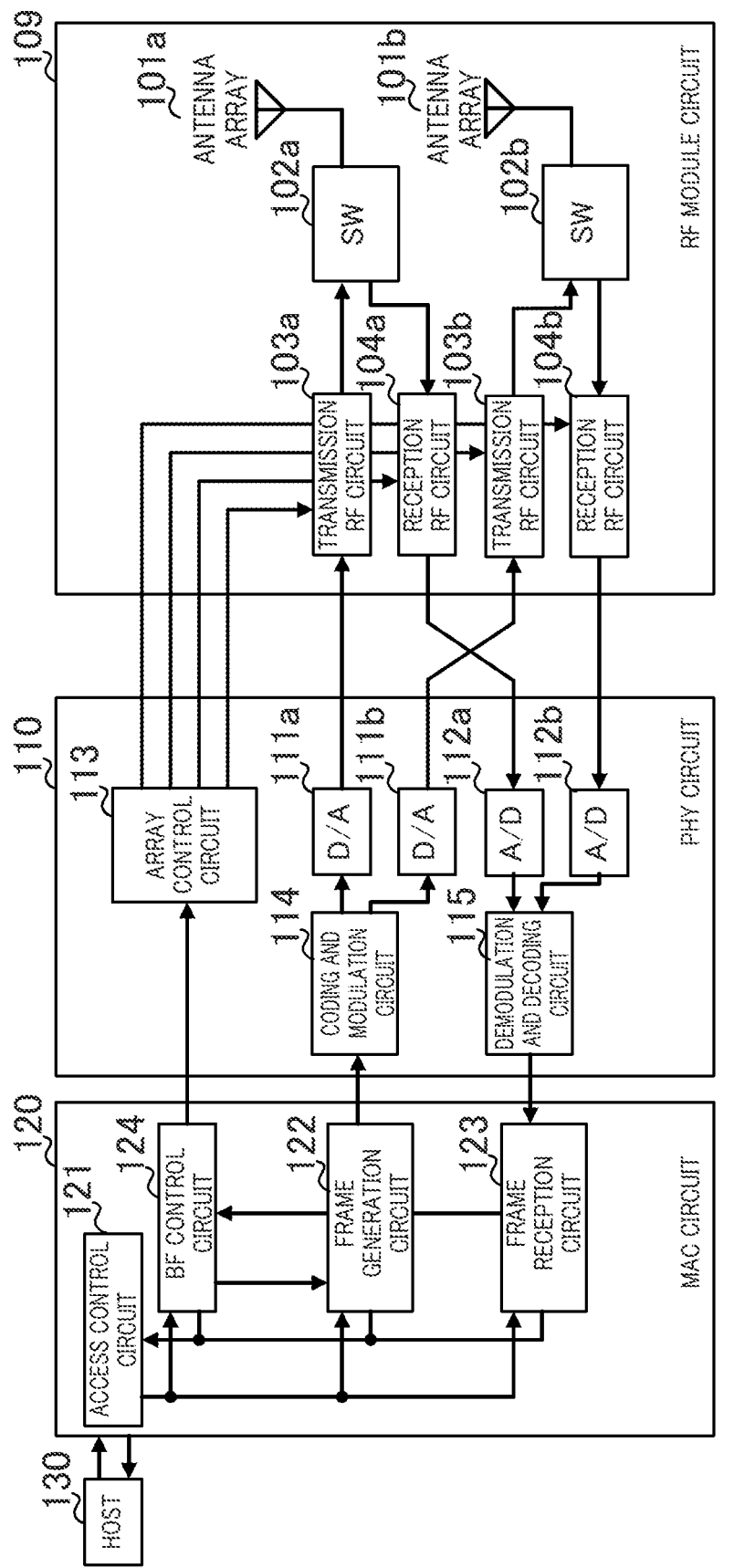
FIG. 2A illustrates an exemplary configuration of a communication apparatus.

FIG. 2A illustrates an exemplary configuration of communication apparatus 100. Communication apparatus 100 includes, by way of example, host 130, MAC circuit 120, PHY circuit 110, and RF module circuit 109.

RF module circuit 109 includes, for example, antenna arrays 101a and 101b, switch circuits (SWs) 102a and 102b, transmission Radio Frequency (RF) circuits 103a and 103b, and reception RF circuits 104a and 104b. Note that, transmission Radio Frequency (RF) circuits 103a and 103b and reception RF circuits 104a and 104b may also be referred to as "transmission high-frequency circuits" and "reception high-frequency circuits."

Antenna arrays 101a and 101b transmit and receive radio signals. Switch circuits 102a and 102b are circuits for switching connection targets to which antenna arrays 101a and 101b are connected, and connecting the antenna arrays to transmission RF circuits 103a and 103b in a transmission operation mode or to reception RF circuits 104a and 104b in a reception operation mode, so as to allow antenna arrays 101a and 101b to perform transmission and reception.

Communication apparatus 100 may also include transmission antenna arrays (e.g., transmission antenna arrays 101a-1 and 101a-2 (not illustrated)) and reception antenna arrays (e.g., reception antenna arrays 102a-1 and 102a-2 (not illustrated)) instead of switch circuits 102a and 102b.

Transmission RF circuits 103a and 103b modulate transmission baseband signals output by D/A converters 111a and 111b, convert the transmission baseband signals into high-frequency signals (e.g., 60 GHz band signals), and output the high-frequency signals to antenna arrays 101a and 101b. In addition, transmission RF circuits 103a and 103b control the phase and/or output of output signals for each of the antenna elements (not illustrated) constituting antenna arrays 101a and 101b, thereby performing a transmission directivity control for antenna arrays 101a and 101b. Note that the transmission directivity control is to control the transmission strength of a radio signal depending on a transmission direction.

Reception RF circuits 104a and 104b convert reception radio signals output from antenna arrays 101a and 101b into reception baseband signals, and output them to A/D converters 112a and 112b. Reception RF circuits 104a and 104b control the phase and/or output of input signals for each of the antenna elements (not illustrated) constituting antenna arrays 101a and 101b, thereby performing a reception directivity control for antenna arrays 101a and 101b. Note that, the reception directivity control is to control the reception sensitivity of a radio signal depending on a reception direction.

PHY circuit 110 includes, by way of example, D/A converters 111a and 111b, A/D converters 112a and 112b, coding and modulation circuit 114, and demodulation and decoding circuit 115.

D/A converters 111a and 111b perform digital/analog conversion on a transmission digital baseband signal output from coding and modulation circuit 114, and output it to transmission RF circuits 103a and/or 103b.

A/D converters 112a and 112b perform analog/digital conversion on a reception analog baseband signal output from reception RF circuits 104a and/or 104b, and output the converted signal to demodulation and decoding circuit 115.

Array control circuit 113 instructs, based on an instruction from BF control circuit 124 of MAC circuit 120, transmission RF circuits 103a and/or 103b or reception RF circuits 104a and/or 104b to perform the transmission directivity control or the reception directivity control.

Coding and modulation circuit 114 encodes (e.g., Low Density Parity Check (LDPC) coding) and modulates (e.g., π/2-Binary Phase Shift Keying (BPSK)) a transmission MAC frame (referred to as "transmission PHY payload") output from frame generation circuit 122 of MAC circuit 120, so as to generate the transmission digital baseband signal and output the signal to D/A converter 111a or 111b.

Demodulation and decoding circuit 115 demodulates and decodes a reception digital baseband signal output from A/D converters 112a and/or 112b, and outputs decoded PHY data (referred to as "reception MAC frame") to frame reception circuit 123 of MAC circuit 120.

The demodulation processing performed by demodulation and decoding circuit 115 includes, for example, synchronization processing (preamble detection, frequency synchronization, and/or timing synchronization), equalization (correction of distortion of a reception signal), and data demodulation (e.g., conversion of π/2-BPSK symbol data into bit data and likelihood data). In addition, the decoding processing includes, for example, LDPC decoding.

MAC circuit 120 includes, by way of example, access control circuit 121, frame generation circuit 122, frame reception circuit 123, and beamforming (BF) control circuit 124.

Access control circuit 121 switches between the transmission mode and the reception mode and determines a transmission timing depending on user data input from host 130 and received data, and controls frame generation circuit 122, frame reception circuit 123, and/or BF control circuit 124. The access control circuit also determines the transmission timing and controls frame generation circuit 122 in order to transmit the user data input from host 130. Further, the access control circuit determines a BFT execution timing and controls BF control circuit 124 in order to perform the beamforming training (BFT).

Host 130 includes, for example, a Central Processing Unit (CPU) or a System on Chip (SoC) and operates an Operating System (OS) or application software (e.g., a web browser or file management software). The host starts or stops the MAC circuit, controls obtainment of status information of the MAC circuit, requests data transmission from the MAC circuit, and/or obtains reception data, for example, in response to a request of the OS or application software.

Figure 2B:
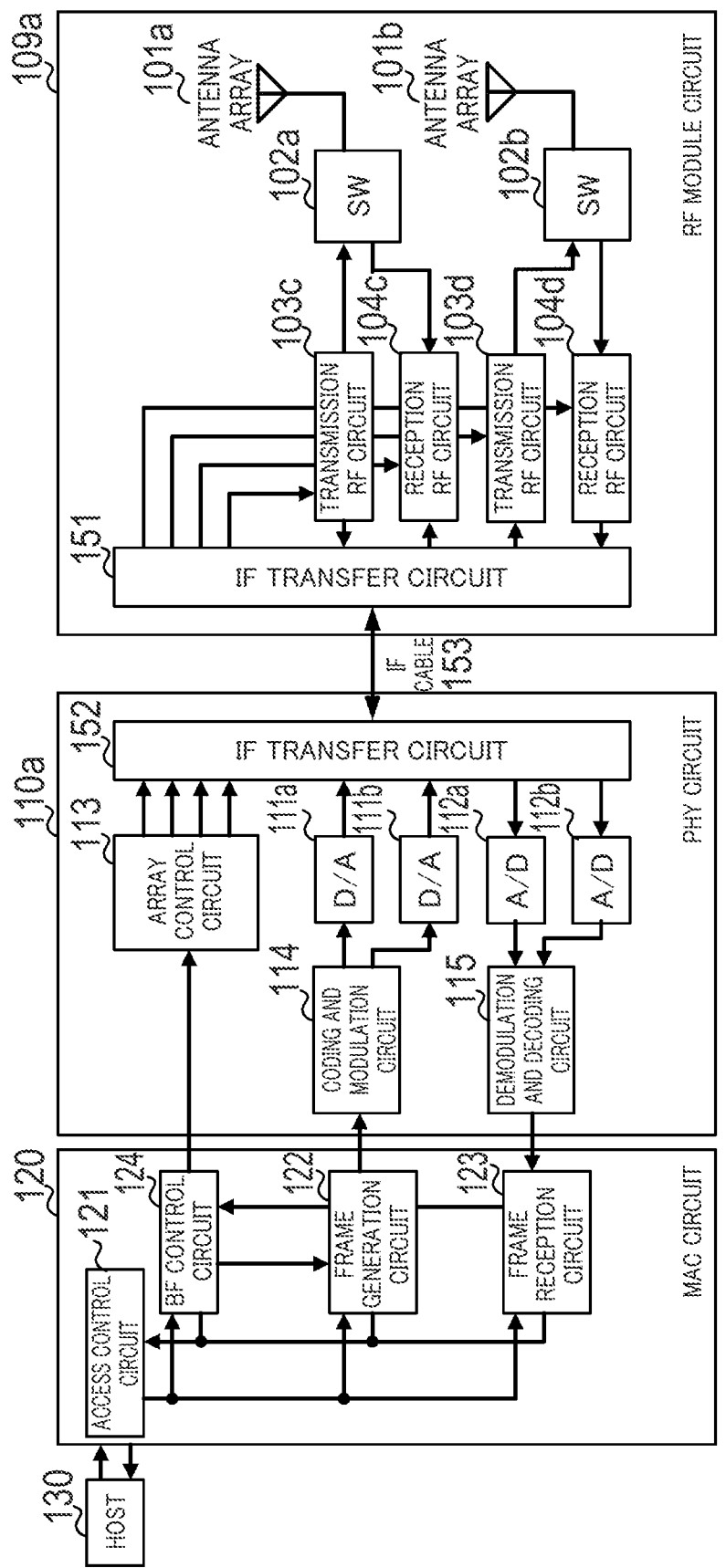
FIG. 2B illustrates an exemplary configuration of the communication apparatus.

FIG. 2B illustrates an exemplary configuration of communication apparatus 100a. Another example different from communication apparatus 100 is illustrated. Communication apparatus 100a includes, for example, host 130, MAC circuit 120, PHY circuit 110a, and RF module circuit 109a.

PHY circuit 110a includes Intermediate Frequency (IF) transfer circuit 152. IF transfer circuit 152 modulates an analog baseband signal (referred to as "IQ signal") output from D/A converters 111a and/or 111b into what is called a transmission Intermediate Frequency (IF) band signal with an intermediate frequency between the frequency of a transmission baseband signal and the frequency of an RF signal, and transfers the modulated signal to the RF module circuit via IF cable 153. Further, IF transfer circuit 152 may modulate a control signal output from array control circuit 113 into an IF band control signal, multiplex the modulated signal with the transmission IF band signal, and output the resultant signal to IF cable 153.

RF module circuit 109a includes IF transfer circuit 151. The RF module circuit includes transmission RF circuits 103c and 103d and reception RF circuits 104c and 104d instead of transmission RF circuits 103a and 103b and reception RF circuits 104a and 104b in FIG. 2A.

IF transfer circuit 151 separates the IF band control signal from IF cable 153, demodulates the control signal output from array control circuit 113, and outputs the demodulated control signal to transmission RF circuits 103c and 103d and reception RF circuits 104c and 104d.

IF transfer circuit 151 also separates the transmission IF band signal and outputs it to transmission RF circuits 103c and/or 103d. Transmission RF circuits 103c and 103d modulate and amplify the transmission IF band signal into a transmission RF signal. Transmission RF circuits 103c and 103d also controls, based on a signal resulting from demodulation of the IF band control signal by IF transfer circuit 151, the amplitude and phase of the transmission RF signal to perform the transmission directivity control.

In addition, while reception RF circuits 104a and 104b demodulate the reception RF signal into the reception baseband signal in FIG. 2A, reception RF circuits 104c and 104d demodulate the reception RF signal into the reception IF band signal in FIG. 2B. IF transfer circuit 151 multiplexes the received IF band signal with another signal, and outputs the multiplexed signal to IF cable 153. IF transfer circuit 152 demodulates the reception IF band signal, generates a reception baseband signal, and outputs the signal to A/D converters 112a and 112b.

In the configuration of FIG. 2B, since a plurality of signals are multiplexed and transmitted to IF cable 153, IF cable 153 can be longer than in the configuration of FIG. 2A, so that PHY circuit 110a and MAC circuit 120 can be installed apart from RF module circuit 109a. However, it is considered that communication apparatuses 100a, 200a, and 300a have an integral function even when PHY circuit 110a and RF module circuit 109a are arranged apart from each other, since a signal transmitted over IF cable 153 is designed according to the configurations of PHY circuit 110a and RF module circuit 109a.

Figure 3:
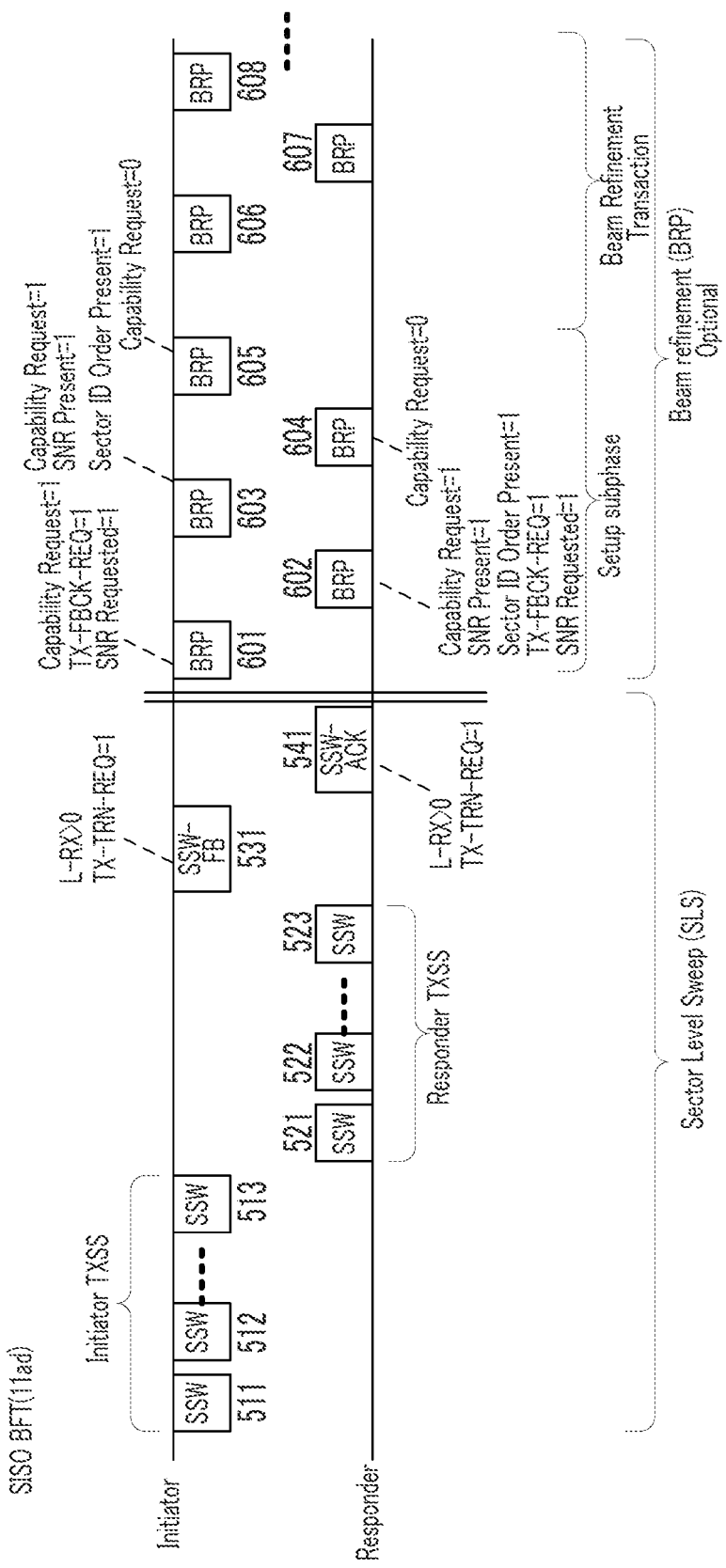
FIG. 3 illustrates an example of a BFT procedure according to the 802.11ad standard.

FIG. 3 illustrates an example of a BFT procedure according to the 802.11ad standard. The BFT includes at least one of Sector Level Sweep (SLS) and Beam Refinement Protocol (BRP).

In SLS, the communication apparatuses switch the directivities of the transmission antennas (referred to as "transmission sectors" or "transmission Antenna Weight Vectors (AWVs)") or the directivities of the reception antennas (referred to as "reception sectors" or "reception AWVs") for each packet to perform BFT. In BRP, the communication apparatuses switch the transmission sectors or reception sectors within a training field in a packet to perform BFT.

Further, in SLS and BRP, the communication apparatuses transmit a response frame including information on a best transmission sector obtained by training (referred to as "best sector"), to perform BFT.

Note that a communication apparatus that starts BFT is referred to as "initiator." A communication apparatus that responds to a request from the initiator is referred to as "responder."

When performing SLS, the initiator first performs initiator transmission sector sweep (Initiator TXSS). In Initiator TXSS, the initiator transmits sector sweep (SSW) frames 511, 512, and 513 while switching the transmission sectors for each of the SSW frames. The responder performs responder transmission sector sweep (Responder TXSS) to respond to Initiator TXSS. In Responder TXSS, the responder transmits SSW frames 521, 522, and 523 while switching the transmission sectors for each of the SSW frames.

The initiator transmits SSW Feedback (SSW-FB) frame 531 and the responder transmits SSW Acknowledgement (SSW-ACK) frame 541 to complete SLS.

When performing BRP, the initiator transmits BRP frame 601 to the responder. When receiving BRP frame 601, the responder transmits, to the initiator, BRP frame 602 including a response depending on the type (described below) of a request included in BRP frame 601.

BRP is performed by repeatedly transmitting BRP frames between the initiator and the responder (Beam Refinement Transaction (hereinafter referred to as "BRT")). BRP may include one or more subphases prior to BRT. The subphases include, by way of example, a setup subphase, a Multiple Sector Identifier (MID) subphase, a Beam Combining (BC) subphase, and an MID Capture (MIDC) subphase, and are performed by transmission of BRP frames from the initiator and the responder as in BRT.

When the responder transmits a BRP frame containing no request, the initiator may stop transmitting a BRP frame to end BRT to end BRP.

Note that, the initiator or the responder may include a request for a BRP frame in the SSW-FB or SSW-ACK frame to perform BRP subsequent to SLS. In FIG. 3, by way of example, the initiator sets the value of a TX-TRN-REQ subfield of SSW-FB frame 531 to 1 to request from the responder that BRP be performed after completion of SLS to perform transmission BFT.

The initiator sets the value of an L-RX subfield of SSW-FB frame 531 to 1 or greater (L-RX>0 in FIG. 3) to request from the responder that BRP be performed after completion of SLS to perform reception BFT.

The initiator transmits, in the setup subphase, BRP frame 601 in which a Capability Request subfield is set to 1. The setup subphase ends when the responder and the initiator transmit BRP frames 604 and 605 in which the Capability Request subfields are set to 0.

The initiator transmits BRP frame 601 in which a TX-FBCK-REQ subfield is set to 1 and an SNR Requested subfield is set to 1.

In response to the fact that the SNR Requested subfield of BRP frame 601 is set to 1, the responder includes a Channel Measurement Feedback element in BRP frame 602 and sets, in a SNR field of the Channel Measurement Feedback element, the value of a Signal to Noise Ratio (SNR) measured while BRP frame 601 is being received (i.e., the value of the reception quality). Note that the SNR may have a plurality of values. The responder sets an SNR Present subfield to 1 to notify the initiator of validity of the value of the SNR field of the Channel Measurement Feedback element.

In addition, the responder transmits the BRP frame in which values of a transmission sector ID and an antenna ID corresponding to the value of the SNR are included in a below-described Sector ID Order field of the Channel Measurement Feedback element. The responder sets a Sector ID Order Present subfield to 1 to notify the initiator of validity of the value of the Sector ID Order field of the Channel Measurement Feedback element.

In this manner, in addition to notifying of the best sector, a transmission apparatus notifies of measurement results of reception quality corresponding to a plurality of transmission sectors (that is, a list of measurement results) in the SNR field and the Sector ID Order field of the Channel Measurement Feedback element. Thus, a transmission apparatus considers Sector IDs included in the list of measurement results as candidate transmission sectors, and performs Beam Refinement Transaction to test combinations of the candidate transmission sectors and reception sectors, so as to be capable of finding a truly best sector with better communication quality than a provisional best sector obtained by SLS.

Figure 4:
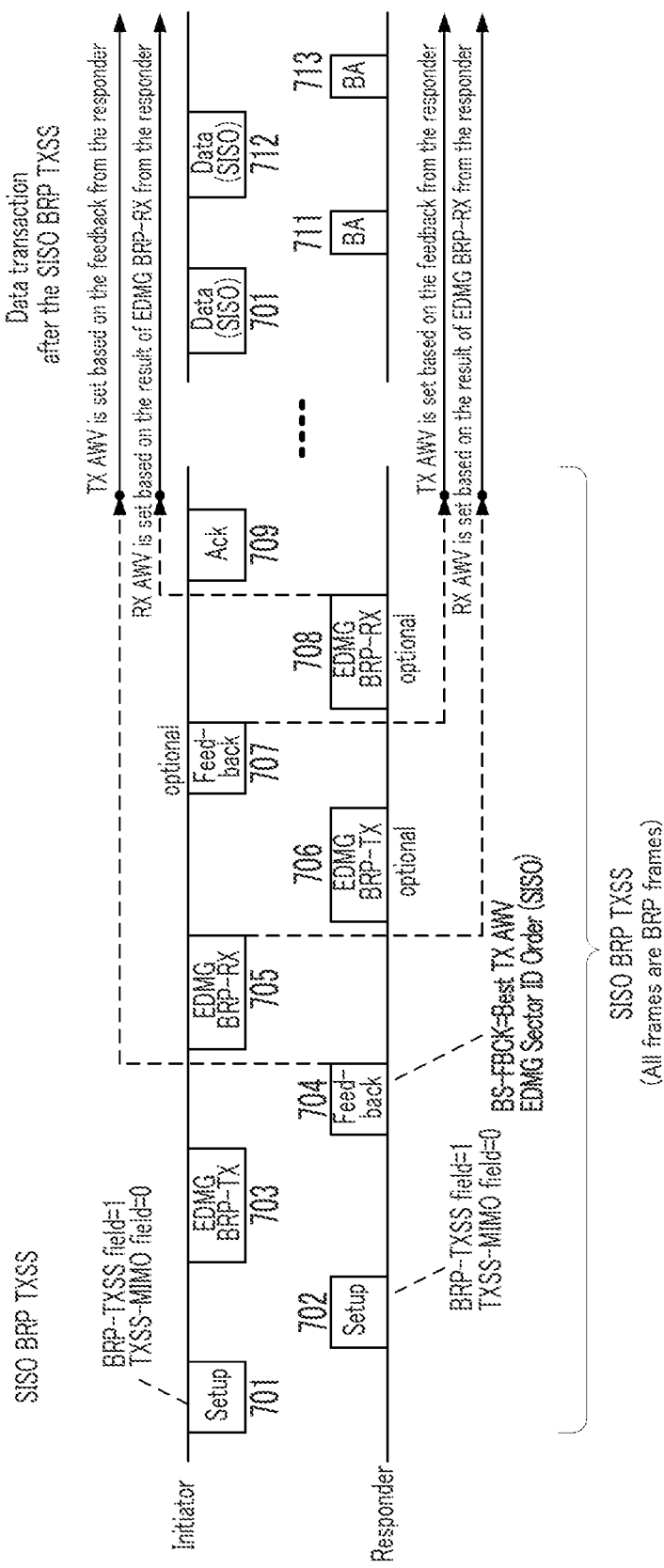
FIG. 4 illustrates a SISO BRP TXSS procedure according to the draft 802.11 ay standard.

FIG. 4 illustrates a SISO BRP TXSS procedure according to the 802.11 ay draft standard. SISO BRP TXSS is one method for the initiator and responder to perform the transmission and reception BFT using BPR frames. Unlike BRP of FIG. 3, the roles and the transmission order of the BRP frames are determined in advance, so that the processing time taken for response by the initiator and the responder (time taken for processing after reception of a BRP frame until transmission of the next BRP frame) can be shortened.

All of the frames transmitted to the initiator and the responder during SISO BRP TXSS in FIG. 4 are BRP frames, and role names (e.g., "Setup" and "Enhanced directional multi-gigabit (EDMG) BRP-TX") are illustrated in FIG. 4.

Setup BRP frames 701 and 702 are frames for notifying of start of the SISO BRP TXSS procedure by a BRP-TXSS field of the BRP frame set to 1 and a TXSS-MIMO field set to 0. The initiator transmits Setup BRP frame 701 to notify of the start of the SISO BRP TXSS procedure, and the responder transmits Setup BRP frame 702 to accept the start of the SISO BRP TXSS procedure.

EDMG BRP-TX frame 703 is a BRP frame for performing the transmission BFT of the initiator.

Feedback BRP frame 704 is a frame for notification of the result of the transmission BFT of the initiator. The responder transmits Feedback BRP frame 704 in which information on the best sector (best AWV) is included in a BS-FBCK subfield of the Feedback BRP frame. The responder may also include a EDMG Channel Measurement Feedback element in Feedback BRP frame 704, include a plurality of combinations of AWVs, transmission antenna IDs, and reception antenna IDs as information indicating the result of transmission BFT in a EDMG Sector ID Order field, and include an SNR value for each of the combinations of the AWVs, transmission antenna IDs, and reception antenna IDs in the SNR field of the Channel Measurement Feedback element.

The responder is capable of including a list of AWVs indicating the result of transmission BFT in the EDMG Sector ID Order field as in the Sector ID Order field of BRP frame 602 in FIG. 3.

The responder may also include training results (SNRs or reception qualities) concerning a plurality of AWVs, such as the best AWV, the second best AWV, . . . , the n-th best AWV, for example, in the EDMG Sector ID Order field.

The responder may also include, in the EDMG Sector ID Order field, training results (SNRs or reception qualities) concerning the AWVs for the respective combinations of transmission antenna IDs and reception antenna IDs, such as the best AWV for the combination (0,0) of a transmission antenna ID and a reception antenna ID, the best AWV for the combination (0,1), the best AWV for the combination (1,0), and the best AWV for the combination (1,1), for example.

EDMG BRP-RX frame 705 is a BRP frame for performing the reception BFT of the responder.

EDMG BRP-TX frame 706 and Feedback BRP frame 707 are BRP frames for performing transmission BFT of the responder and for feedback, respectively. EDMG BRP-RX frame 708 is a BRP frame for performing reception BFT of the initiator. Note that transmission and reception of EDMG BRP-TX frame 706, Feedback BRP frame 707, and EDMG BRP-RX frame 708 may be omitted.

The initiator transmits Ack BRP frame 709 and notifies the responder of the end of the SISO BRP TXSS procedure. After transmitting the Ack BRP frame, the initiator changes the transmission AWV based on the value of the BS-FBCK field included in Feedback Ack frame 704. The initiator also receives EDMG BRP-RX frame 708 to perform reception BFT, and changes the reception AWV of the initiator based on the result of the reception BFT.

After receiving the Ack BRP frame, the responder changes the transmission AWV based on the value of the BS-FBCK field included in Feedback Ack frame 707. The responder also receives EDMG BRP-RX frame 705 to perform reception BFT, and changes the reception AWV of the responder based on the result of the reception BFT.

The initiator and the responder transmit and receive data using the best sectors (AWVs) set by the SISO BRP TXSS procedure. By way of example, the initiator transmits single-stream (SISO) data frames 710 and 712 using the optimal transmission AWV designated in the BS-FBCK field of feedback BRP frame 704. The initiator also receives BA (BlockAck) frames 711 and 713 using the optimal reception AWV determined through reception of EDMG BRP-RX frame 705.

Figure 5:
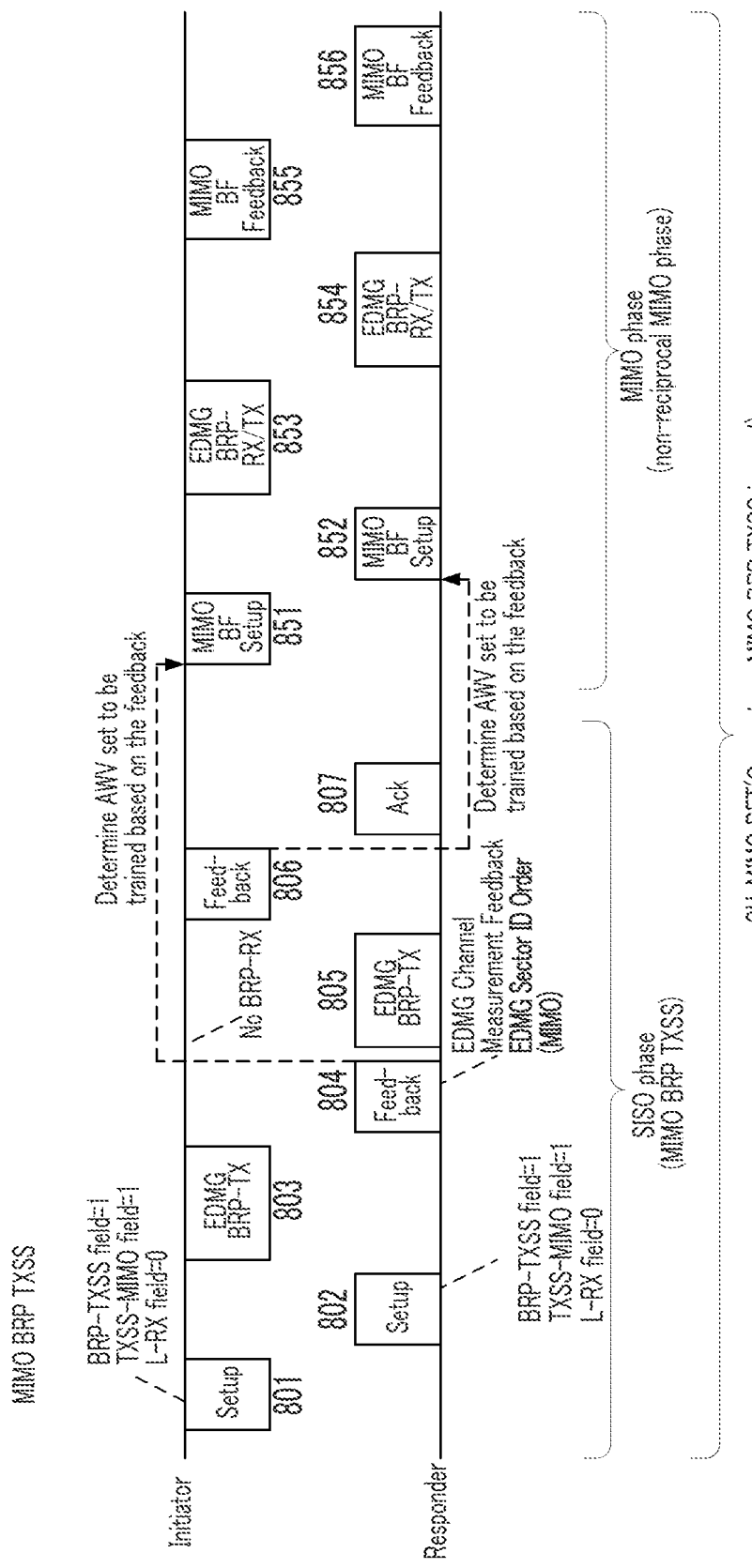
FIG. 5 illustrates an example of a SU-MIMO BFT procedure according to the draft 802.11ay standard.
Figure 6:
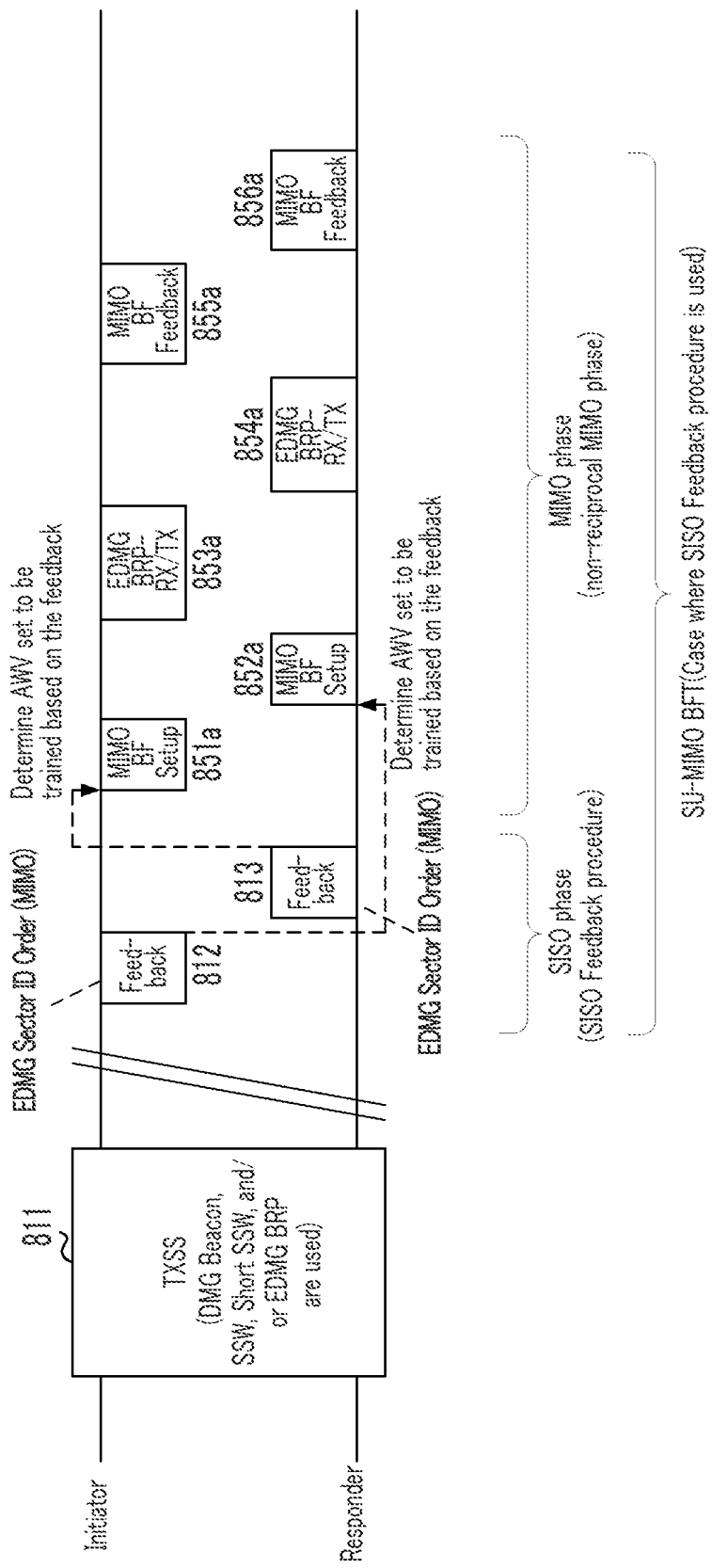
FIG. 6 illustrates an example of the SU-MIMO BFT procedure according to the draft 802.11ay standard.

FIGS. 5 and 6 illustrate examples of a SU-MIMO BFT procedure according to the draft 802.11ay standard. The SU-MIMO BFT procedure is one method for the initiator and the responder to perform the transmission and reception BFT with multiple antennas using BPR frames. The SU-MIMO BFT procedure is performed prior to SU-MIMO data communication.

The SU-MIMO BFT procedure includes a SISO phase and a MIMO phase. The SISO phase includes a method using a MIMO BRP TXSS procedure (FIG. 5) and a method using SISO Feedback Procedure (FIG. 6).

The procedure of FIG. 5 will be described. Setup BRP frames 801 and 802 are frames for notifying of the start of the MIMO BRP TXSS procedure by a BRP-TXSS field of the BRP frame set to 1 and a TXSS-MIMO field set to 1. The initiator transmits Setup BRP frame 801 to notify of the start of the MIMO BRP TXSS procedure, and the responder transmits Setup BRP frame 802 to accept the start of the MIMO BRP TXSS procedure.

EDMG BRP-TX frame 803 is a BRP frame for performing transmission BFT of the initiator. When the initiator includes a plurality of transmission antennas (antenna arrays) 101*a* and 101*b*, the initiator may transmit a training pattern from each of transmission antennas 101*a* and 101*b* by switching the transmission antennas during transmission of EDMG BRP-TX frame 803. In addition, the initiator may perform training for each of transmission antennas 101*a* and 101*b* by transmitting a plurality of BRP-TX frames 803 for each of transmission antennas 101*a* and 101*b*. Further, the initiator repeats transmission of BRP-TX frame 803 depending on the number of reception antennas (antenna arrays) 101*a* and 101*b* of the responder, so as to perform training for all combinations of the transmission antennas of the initiator and the reception antennas of the responder.

Feedback BRP frame 804 is a frame for notification of the result of transmission BFT of the initiator. The responder may also include the EDMG Channel Measurement Feedback element in Feedback BRP frame 804, include a plurality of combinations of AWVs, transmission antenna IDs, and reception antenna IDs as information indicating the result of transmission BFT in a EDMG Sector ID Order field, and include an SNR value for each of the combinations of the AWVs, transmission antenna IDs, and reception antenna IDs in the SNR field of the Channel Measurement Feedback element.

In the EDMG Sector ID Order field, the initiator feeds back a plurality of AWVs for each combination of the transmission antennas of the initiator and the reception antennas of the responder. When the number of AWVs for each of the combinations is less than or equal to 16, the initiator selects all the AWVs, and when the number of AWVs is greater than 16, the initiator selects 16 AWVs (e.g., 16 AWVs with good reception quality), and includes the AWVs in the EDMG Sector ID Order field.

The responder then transmits EDMG BRP-TX frame 805 and the initiator receives Feedback BRP frame 806. The initiator thus performs training as with EDMG BRP-TX frame 803 and Feedback BRP frame 804. Thereafter, the responder transmits Ack BRP frame 807 to complete the MIMO BRP TXSS procedure.

In the MIMO phase, the initiator and the responder transmit MIMO BF Setup BRP frames 851 and 852 for notification of the start of the MIMO phase. Note that, based on the feedback results (Feedback BRP frames 804 and 806) received in the SISO phase, the initiator and the responder include a list of the combinations of the transmission and reception antennas and AWVs for performing training of MIMO BFT in MIMO BF Setup BRP frames 851 and 852.

The initiator and the responder transmit EDMG BRP-RX/TX frames 853 and 854, respectively, to perform the MIMO BFT training. This is done by including MIMO training patterns (simultaneous transmission of training signals by multiple antennas) in EDMG BRP-RX/TX frames 853 and 854 based on the combinations of the transmission and reception antennas and AWVs included in MIMO BF Setup BRP frames 851 and 852.

The initiator and the responder transmit MIMO BF Feedback frames 855 and 856 to complete the MIMO phase and SU-MIMO BFT.

After SU-MIMO BFT is completed, the initiator and the responder transmit SU-MIMO data frames (not illustrated) using the combinations of the transmission and reception antennas and AWVs as notified by MIMO BF Feedback frames 855 and 856.

The procedure in FIG. 6 will be described. Since the procedure in the MIMO phase is the same as that in FIG. 5, descriptions thereof are omitted.

When SISO BFT 811 has been completed prior to the start of SU-MIMO BFT, the initiator and the responder may perform the SISO Feedback procedure instead of MIMO BFT TXSS for the SISO phase. SISO BFT 811 may, for example, be SLS (see FIG. 3), SISO BRP TXSS (see FIG. 4), or MIMO BRP TXSS (see FIG. 5).

When performing SISO BFT 811, the initiator performs training for all the combinations of the transmission antennas of the initiator and the reception antennas of the responder. The responder retains the result. For example, BF control circuit 124 retains SNR values for the combinations of the transmission and reception antennas and AWVs in the memory.

Similarly, when performing SISO BFT 811, the responder performs training for all the combinations of the transmission antennas of the responder and the reception antennas of the initiator. The initiator retains the result.

Note that, the initiator and the responder in SU-MIMO BFT may be the same as the initiator and the responder in SISO BFT, or may also be reversed (replaced with each other).

The initiator and the responder include the EDMG Channel Measurement Feedback elements respectively in Feedback BRP frames 812 and 813, include one or more combinations of AWVs, transmission antenna IDs, and reception antenna IDs as information indicating the result of transmission BFT in each of the EDMG Sector ID Order fields, and include SNR values for respective combinations of the AWVs, transmission antenna IDs, and reception antenna IDs in the SNR fields of the Channel Measurement Feedback elements. This corresponds to the information contained in Feedback BRP frames 806 and 804 of FIG. 5.

Based on the received feedback results (Feedback BRP frames 812 and 813), the initiator and the responder include, in MIMO BF Setup BRP frames 851a and 852a, a list of the combinations of the transmission and reception antennas and AWVs for performing training of MIMO BFT.

Note that there may be a time interval between SISO BFT 811 and Feedback BRP frame 812. For example, another communication apparatus (not illustrated) may perform data communication after SISO BFT 811.

As is understood, the SISO Feedback procedure of FIG. 6 can be completed in a short time since the number of frames to be transmitted and received is smaller than in MIMO BRP TXSS of FIG. 5. However, the initiator and the responder need to retain the training results for the combinations of the transmission and reception antennas and the AWVs in SISO BFT.

Figure 7:
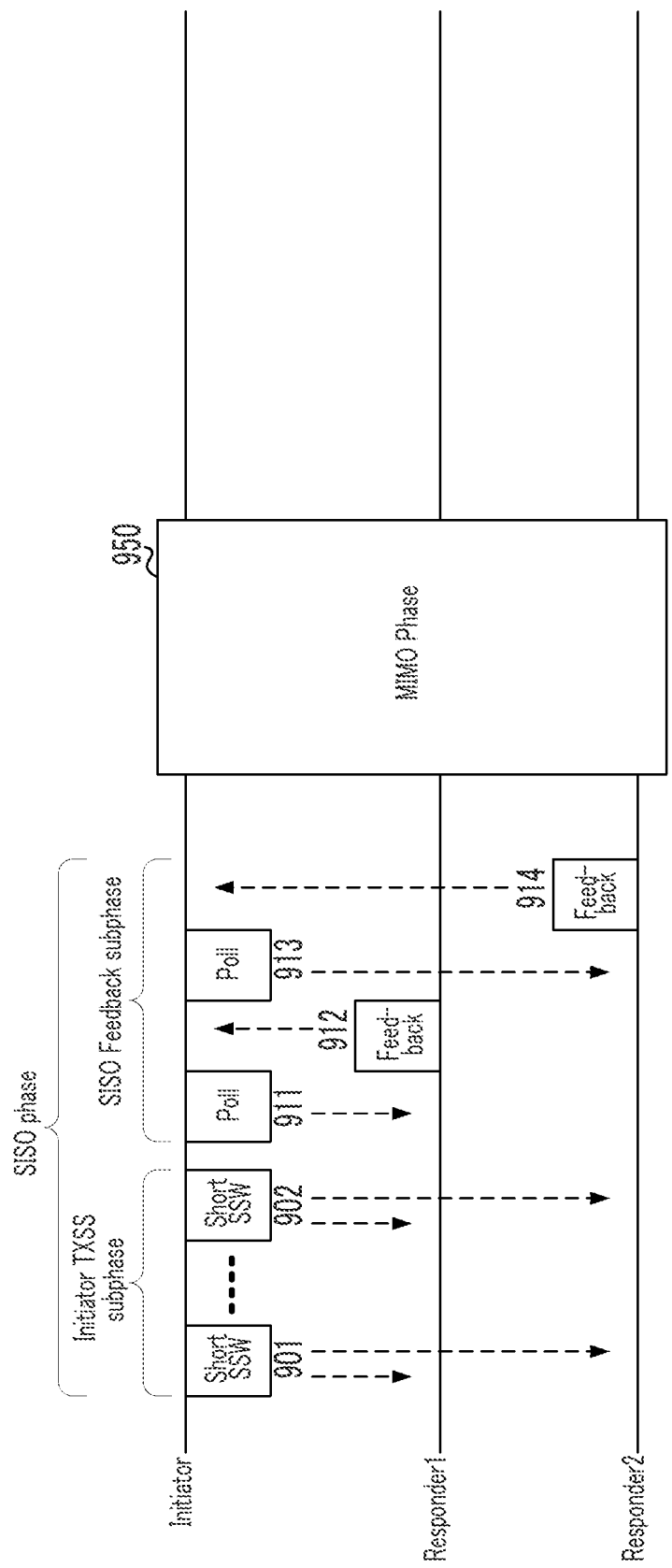
FIG. 7 illustrates an example of a MU-MIMO BFT procedure according to the draft 802.11ay standard.
Figure 8:
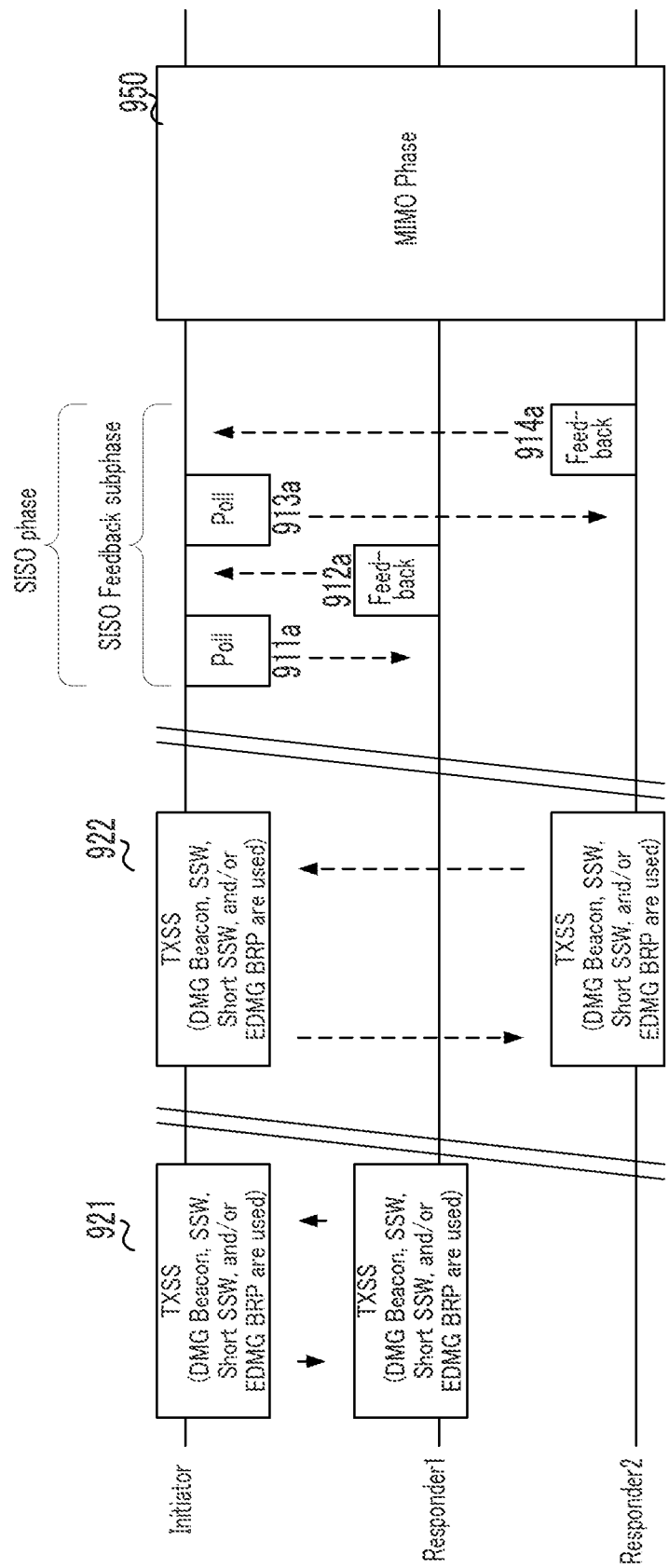
FIG. 8 illustrates an example of the MU-MIMO BFT procedure according to the draft 802.11ay standard.

FIGS. 7 and 8 illustrate examples of a MU-MIMO BFT procedure according to the 802.11 ay draft standard. The MU-MIMO BFT procedure is one method for the initiator and a plurality of responders to perform transmission with multiple antennas and BFT with one or more reception antennas using BPR frames. The MU-MIMO BFT procedure is performed prior to MU-MIMO data communication.

The MU-MIMO BFT procedure includes a SISO phase and a MIMO phase. The MIMO phase is a procedure of training for MIMO transmissions like the MIMO phase of SU-MIMO BFT. Detailed description is omitted. The SISO phase includes an Initiator TXSS subphase and a SISO Feedback subphase (see FIG. 7), but the Initiator TXSS subphase may sometimes be omitted (FIG. 8).

The procedure of FIG. 7 will be described. In FIG. 7, the initiator (e.g., communication apparatus 100), responder 1 (e.g., communication apparatus 200), and responder 2 (e.g., communication apparatus 300) perform MU-MIMO BFT.

In the Initiator TXSS subphase, the initiator transmits a plurality of Short SSW frames 901 and 902 while changing transmission sectors for each of the Short SSW frames. Responder 1 and responder 2 measure and retain reception qualities of Short SSW frames 901 and 902. For example, BF control circuit 124 retains SNR values for the combinations of the transmission and reception antennas and sectors in the memory.

In the SISO Feedback subphase, the initiator transmits Poll BRP frames to the respective responders and asks for responses by Feedback BRP frames. The initiator transmits Poll BRP frame 911 to responder 1.

Responder 1 includes the EDMG Channel Measurement Feedback element in Feedback BRP frame 912, includes a plurality of combinations of AWVs, transmission antenna IDs, and reception antenna IDs as information indicating the result of transmission BFT in the EDMG Sector ID Order field, and includes an SNR value for each of the combinations of the AWVs, transmission antenna IDs, and reception antenna IDs in the SNR field of the Channel Measurement Feedback element. Responder 1 also includes an EDMG BRP Request element in Feedback BRP frame 912, and includes, in a L-TX-RX field and a Requested EDMG TRN UNIT M field, information on the number of reception AWVs for which training is performed in the MIMO phase.

The initiator transmits Poll BRP frame 913 to responder 2. Responder 2 includes the EDMG Channel Measurement Feedback element and the EDMG BRP Request element in Feedback BRP frame 914 and transmits the Feedback BRP frame. Note that since Feedback BRP frame 914 is the same as Feedback BRP frame 912, other descriptions are omitted.

In the MIMO phase, MIMO training is performed for the combinations of the transmission and reception antennas and AWVs specified by feedback information included in Feedback BRP frames 912 and 914 and for the number of reception AWVs, so as to determine the combinations of transmission and reception antennas and AWVs used for MU-MIMO data communication.

The procedure of FIG. 8 will be described. In a case where the initiator has already completed SISO BFT (e.g., SISO BFTs 921 and 922) with both responders 1 and 2, the Initiator TXSS subphase may be omitted.

Responder 1 performs SISO BFT 921 with the initiator and retains the training result. The detail of the SISO BFT is the same as SISO BFT 811 of FIG. 6. Responder 2 performs SISO BFT 922 with the initiator and retains the training result.

Based on the training results retained in SISO BFT 921, responder 1 includes a list of combinations of transmission and reception antennas and AWVs, and SNRs for each of the combinations in Feedback BRP frame 912a and transmits the Feedback BRP frame.

Based on the training results retained in SISO BFT 922, responder 2 includes a list of combinations of transmission and reception antennas and AWVs, and SNRs for each of the combinations in Feedback BRP frame 914a and transmits the Feedback BRP frame.

Since MIMO phase 950 of FIG. 8 is the same as that of FIG. 7, descriptions thereof are omitted.

Note that, there may be a time interval between the end of SISO BFT 921 and the start of SISO BFT 922 and between the end of SISO BFT 922 and the start of the SISO phase.

For example, another communication apparatus (not illustrated) may perform data communication after SISO BFT 922.

As is understood, the SISO phase of FIG. 8 can be completed in a shorter time because the number of frames to be transmitted and received is smaller than in the SISO phase of FIG. 7. Note that, the initiator and the responder retain the training results for the combinations of the transmission and reception antennas and AWVs in SISO BFT.

Figure 9:
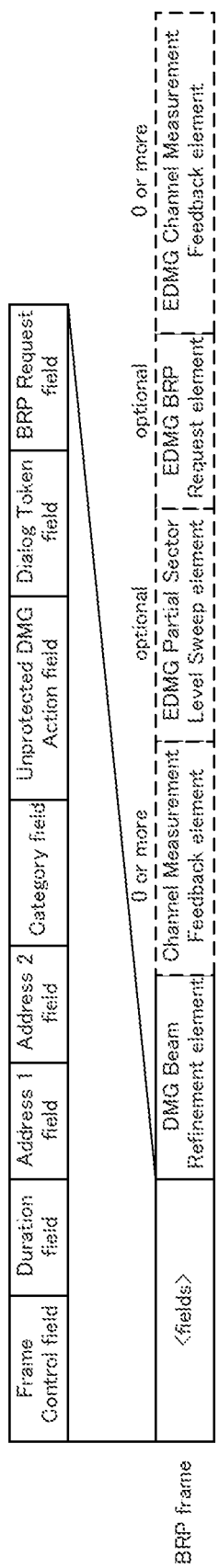
FIG. 9 illustrates a format of a BRP frame used in FIGS. 3 to 8.

FIG. 9 illustrates a format of the BRP frame used in FIGS. 3 to 8. The BRP frame includes a Frame Control field, Duration field, Address1 field, Address2 field, Category field, Unprotected Directional multi-gigabit (DMG) Action field, Dialog Token field, BRP Request field, DMG Beam Refinement element, Channel Measurement Feedback element, EDMG Partial Sector Level Sweep element, EDMG BRP Request element, and EDMG Channel Measurement Feedback element.

The Frame Control field, Duration field, Address1 field, Address2 field, Category field, Unprotected DMG Action field, Dialog Token field, and BRP Request field are abbreviated as <fields>.

The Channel Measurement Feedback element, EDMG Partial Sector Level Sweep element, EDMG BRP Request element, and EDMG Channel Measurement Feedback element are optional elements and may be omitted.

The BRP frame is of a single format illustrated in FIG. 9, but functions as frames having different roles (e.g., Setup BRP frame, Feedback BRP frame, and the like) as illustrated in FIGS. 3 to 8.

The BFT procedures according to the 802.11ad standard have been described above. However, since the BRP frame format is the same, it is difficult for communication apparatus 100 (responder) to distinguish whether the received BRP frame is BRP frame 601 of FIG. 3 (the initiator intends the Setup subphase of SISO BRP), the Setup BRP frame of FIG. 4 (the initiator intends SISO BRP TXSS), the Setup BRP frame of FIG. 5 (the initiator intends MIMO BRP TXSS of SU-MIMO), the Feedback BRP frame of FIG. 6 (the initiator intends the SISO Feedback procedure of SU-MIMO), or the Poll BRP frame of FIG. 8 (the initiator intends the SISO phase of MU-MIMO).

Further, since TXSS of FIGS. 6 and 8 intends SISO BFT, it is difficult for the responder to know in advance whether or not the SISO phase of SU-MIMO BFT after TXSS is carried out (see FIG. 6), and whether or not MU-MIMO BFT in which the Initiator TXSS subphase is omitted is carried out (see FIG. 8).

For example, in TXSS of FIG. 6, when the responder performs a selection of the best sector with the intention for SISO BFT, it is difficult to include combinations of transmission and reception antennas and AWVs, and the information on SNRs in Feedback BRP frame 813 to transmit the Feedback BRP frame. That is, it is difficult for the responder to respond appropriately even when the responder can determine that Feedback BRP frame 812 is intended for the SISO Feedback procedure.

Hereinafter, a method in which communication apparatus 100 distinguishes the intention of the BRP frame received, and appropriately responds thereto will be described.

Embodiment 1

According to the type (FIG. 3, 4, 5, 6, 7, or 8) of the BFT procedure to be carried out using the BRP frame, communication apparatus 100 determines the types of element to be included in the BRP frame to be transmitted first, and transmits the BRP frame without including other optional elements in the BRP frame. Thus, the responder can distinguish the type of the BFT procedure.

FIGS. 10A to 10D and FIG. 11 illustrate formats of the BRP frame to be transmitted first when communication apparatuses 100 (initiator and responder) perform the BFT procedure of FIG. 3, 4, 5, 6, 7, or 8. FIGS. 10A to 10D illustrate elements included in the BRP frame, and FIG. 11 illustrates values of the elements, fields, and subfields. Note that, some of the elements, fields, and subfields are illustrated, and others are omitted in FIG. 11.

Figure 10A:
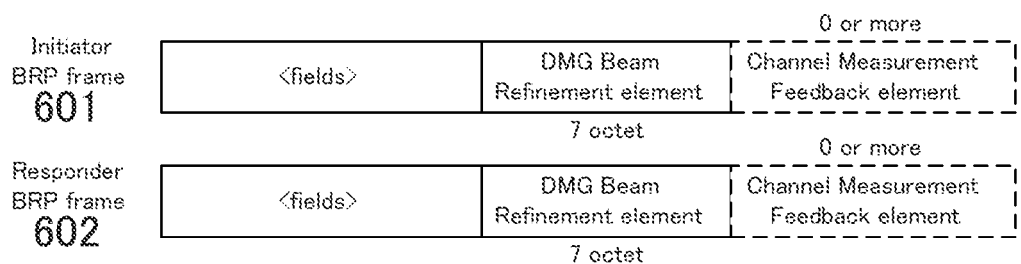
FIG. 10A illustrates a format of the BRP frame to be transmitted first when the communication apparatus performs the BFT procedure of FIG. 3, 4, 5, 6, 7, or 8.

As illustrated in FIG. 10A, when performing BRP of SISO TXSS (see FIG. 3), the initiator includes a 7-octet DMG Beam Refinement element in BRP frame 601 and transmits the BRP frame in the Setup subphase.

Figure 10B:
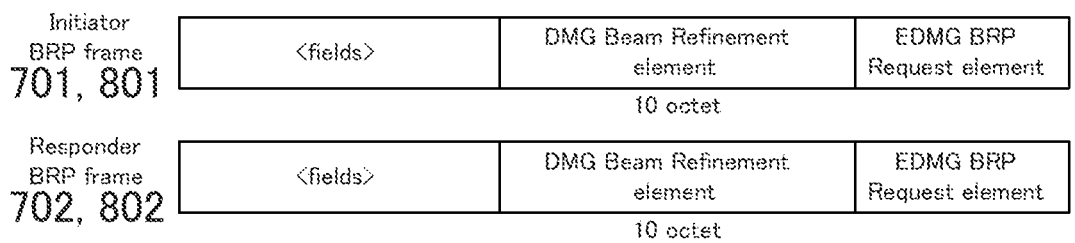
FIG. 10B illustrates a format of the BRP frame to be transmitted first when the communication apparatus performs the BFT procedure of FIG. 3, 4, 5, 6, 7, or 8.

As illustrated in FIG. 10B, when the initiator performs SISO BRP TXSS (see FIG. 4) or MIMO BRP TXSS (see FIG. 5), the initiator includes a 10-octet DMG Beam Refinement element and the EDMG BRP Request element in BRP frame 701 or 801 and transmits the BRP frame. As illustrated in FIG. 11, the initiator sets the value of the BRP-TXSS field to 1. Further, the initiator sets the value of the TXSS-MIMO field of BRP frame 701 to 0 in the case of SISO BRP TXSS or sets the value of the TXSS-MIMO field of BRP frame 801 to 1 in the case of MIMO BRP TXSS.

Note that the 7-octet DMG Beam Refinement element illustrated in FIG. 10A is defined in the 11ad standard, and the 10-octet DMG Beam Refinement element illustrated in FIG. 10B is defined in the flay draft standard.

As illustrated in FIG. 10C, when performing the SISO Feedback procedure of SU-MIMO (see FIG. 6), the initiator includes the 10-octet DMG Beam Refinement element, Channel Measurement Feedback element, and EDMG Channel Measurement Feedback element in BRP frame 812 and transmits the BRP frame. As illustrated in FIG. 11, the initiator sets the value of the BRP-TXSS field to 1.

Further, the initiator sets each of the SNR Requested field and Sector ID Order subfield of the FBCK-REQ field to 1. Accordingly, the responder is requested to feed back a list of AWVs and SNRs. The initiator also sets the value of each of the TXSS-FBCK-REQ field, the SNR Present subfield of the FBCK-TYPE field, and the Sector ID Order Present subfield to 1.

With this setting, the initiator notifies of the validity of the value of the SNR field of the Channel Measurement Feedback element of BRP frame 812 and the value of the EDMG Sector ID Order field of the EDMG Channel Measurement Feedback element.

As illustrated in FIG. 10D, when performing the SISO Feedback subphase of MU-MIMO (see FIGS. 7 and 8), the initiator includes the 10-octet DMG Beam Refinement element in BRP frame 911 or 911a and transmits the BRP frame. The initiator sets the values of the TXSS-FBCK-REQ field, the SNR Present subfield of the FBCK-TYPE field, and the Sector ID Order Present subfield to 1.

The initiator sets, in a Length field in the DMG Beam Refinement element, the number of octets of the DMG Beam Refinement element minus 2 octets (the number of octets of the Element ID field plus the number of octets of the Length field).

Figure 12:
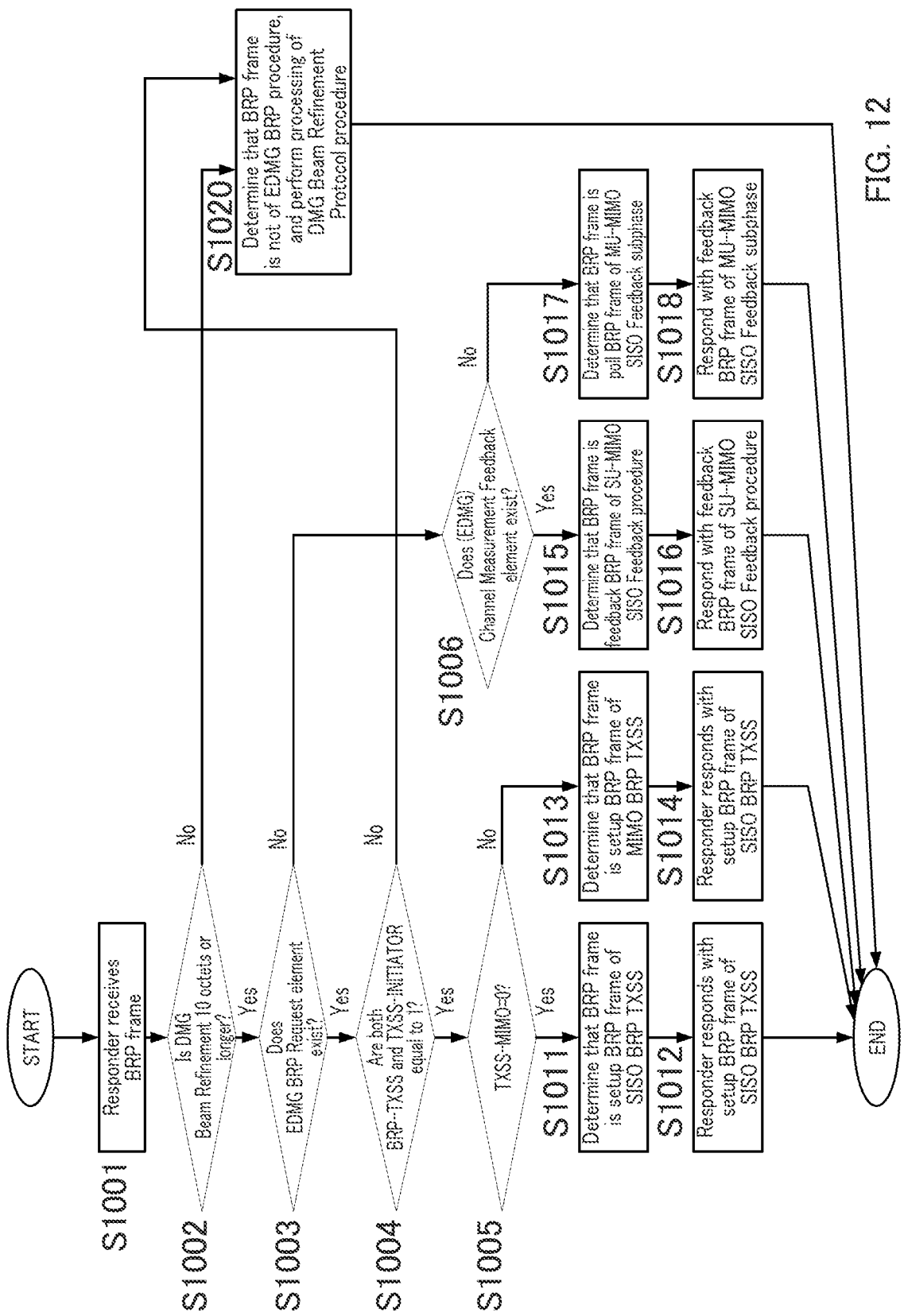
FIG. 12 is a flowchart illustrating a procedure for distinguishing the type of the BFT procedure (FIG. 3, 4, 5, 6, 7, or 8) when a responder receives a BRP frame.

FIG. 12 is a flowchart illustrating a procedure for distinguishing the type of the BFT procedure (FIG. 3, 4, 5, 6, 7, or 8) when the responder receives the BRP frame.

At step S1001, the responder receives the BRP frame.

At step S1002, the responder determines whether or not the DMG Beam Refinement element is 10 octets or greater in length (the value of the Length field is 8 or greater). In the case of Yes, the procedure proceeds to step S1003. In the case of No, the procedure proceeds to step S1020.

Note that, at step S1002, the responder may determine whether or not the value of an EDMG Extension Flag field is 1 instead of determining the length of DMG Beam Refinement element. The case where the value of the EDMG Extension Flag field is 1 corresponds to "Yes." The case where the value of the EDMG Extension Flag field is 0 or the field does not exist corresponds to "No."

At step S1003, the responder determines whether or not the EDMG BRP Request element exists. In the case of Yes, the procedure proceeds to step S1004. In the case of No, the procedure proceeds to step 1006.

At step S1004, the responder determines whether or not both of the values of the BRP-TXSS field and of the TXSS-Initiator field are 1. In the case of Yes, the procedure proceeds to step S1005. In the case of No, the procedure proceeds to step 1020.

At step S1005, the responder determines whether or not the value of the TXSS-MIMO field is 0. In the case of Yes, the procedure proceeds to step S1011. In the case of No, the procedure proceeds to step 1013.

At step S1006, the responder determines whether or not the EDMG Channel Measurement Feedback element exists. In the case of Yes, the procedure proceeds to step S1015. In the case of No, the procedure proceeds to step 1017.

Note that at step S1006, the responder may determine whether or not the Channel Measurement Feedback element exists instead of determining whether or not the EDMG Channel Measurement Feedback element exists. The responder may also determine whether or not the value of the EDMG Channel Measurement Present subfield is 1. The responder may also determine whether or not each subfield of FBCK-TYPE field contains a non-zero value.

When the procedure proceeds to step S1011 based on the above determinations, the responder determines that the received BRP frame is Setup BRP frame 701 of SISO BRP TXSS (FIG. 4). At step S1012, Setup BRP frame 702 is transmitted.

When the procedure proceeds to step S1013, the responder determines that the received BRP frame is Setup BRP frame 801 of MIMO BRP TXSS (FIG. 5). At step S1014, Setup BRP frame 802 is transmitted.

When the procedure proceeds to step S1015, the responder determines that the received BRP frame is Feedback BRP frame 812 of the SISO Feedback procedure of SU-MIMO BFT. At step S1016, Feedback BRP frame 813 is transmitted.

When the procedure proceeds to step S1017, the responder determines that the received BRP frame is Poll BRP frame 911 or 911a of MU-MIMO BFT. At step S1018, Feedback BRP frame 912 or 912a is transmitted.

When the procedure proceeds to step S1020, the responder determines that the received BRP frame is not of the EDMG BRP procedure (FIG. 4, 5, 6, 7 or 8), and transmits BRP frame 602 to perform the SISO BRP procedure of FIG. 3.

Figure 13:
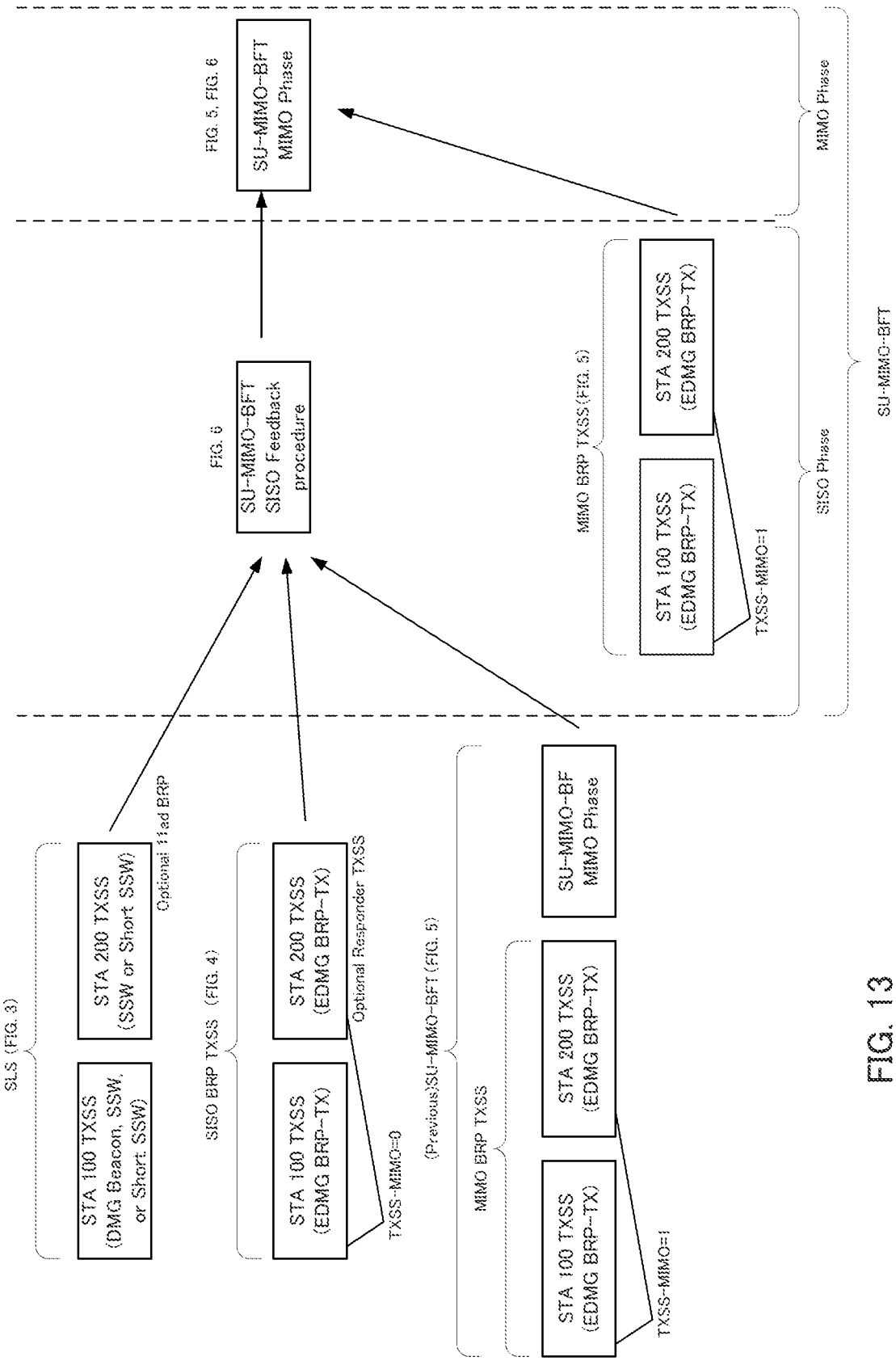
FIG. 13 illustrates the types of SISO BFT that can be used in combination with a SISO Feedback procedure of SU-MIMO BFT by an initiator using the BRP frame of FIG. 10A, 10B, 10C, 10D, or 11 as a leading BRP frame of the procedure.

FIG. 13 illustrates the types of SISO BFT that can be used in combination with the SISO Feedback procedure of SU-MIMO BFT when the initiator uses the BRP frame of FIG. 10A, 10B, 10C, 10D, or 11 as the leading BRP frame of the procedure.

By way of example, communication apparatus (STA) 100 performs SLS of FIG. 3 with STA 200 and performs the SISO Feedback procedure and MIMO Phase of FIG. 6 to complete SISO BFT and SU-MIMO BFT.

By way of another example, STA 100 performs SISO BRP TXSS of FIG. 4 with STA 200 and performs the SISO Feedback procedure and MIMO Phase of FIG. 6 to complete SISO BFT and SU-MIMO BFT.

By way of another example, STA 100 performs MIMO BRP TXSS and MIMO Phase of FIG. 5 with STA 200 to complete the first SU-MIMO BFT.

Further, when the first SU-MIMO BFT is completed, STA 100 may perform the SISO Feedback procedure and MIMO Phase of FIG. 6 to complete the second SU-MIMO BFT.

For example, in a case where there is any obstruction between STA 100 and STA 200 when STA 100 and STA 200 perform SU-MIMO data transmission after completion of the first SU-MIMO BFT, the STAs include combinations of transmission and reception antennas and AWVs and SNRs retained at the occasion of the first SU-MIMO BFT in Feedback BRP frames 812 and 813 of FIG. 6 and transmit the Feedback BRP frames, so as to complete SU-MIMO BFT. Thus, in the second SU-MIMO BFT, it is possible to omit MIMO BRP TXSS and SISO TXSS (811 in FIG. 6), and to shorten the time taken for carrying out SU-MIMO BFT.

Figure 14:
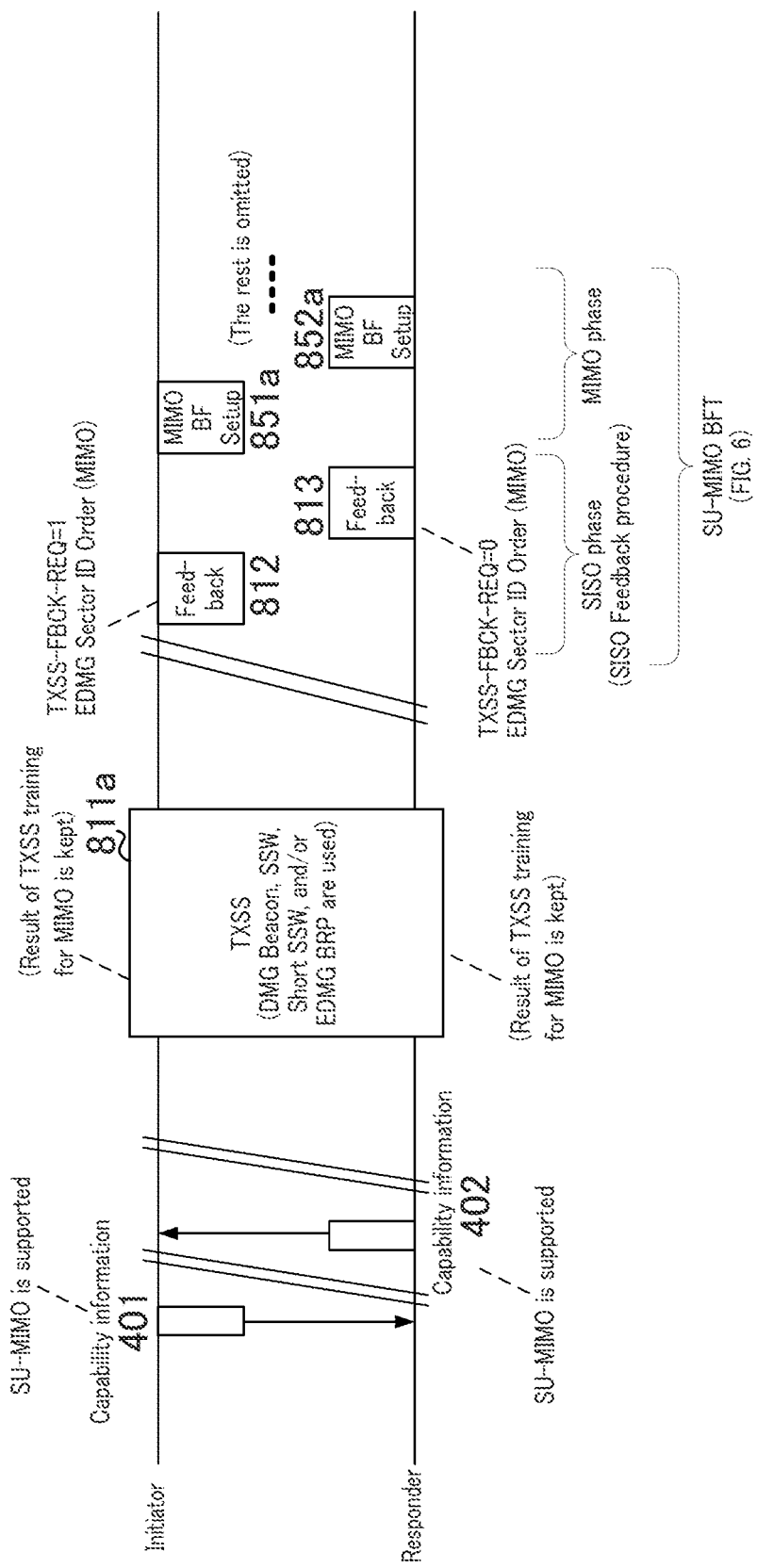
FIG. 14 illustrates details of a procedure for communication apparatuses to perform SU-MIMO BFT of FIG. 6 using the BRP frame illustrated in FIG. 10A, 10B, 10C, 10D or 11.

FIG. 14 illustrates a procedure for communication apparatuses (initiator and responder) to perform SU-MIMO BFT of FIG. 6 using the BRP frame illustrated in one of FIGS. 10A to 10D and FIG. 11. The same BRP frames as in FIG. 6 are provided with the same reference numerals, and the description thereof is omitted.

The initiator and the responder transmit Capability information 401 and 402 prior to starting SU-MIMO BFT.

The Capability information includes a list of functions supported by the initiator and the responder, and includes a field indicating whether or not SU-MIMO and MU-MIMO are to be supported. Note that, the initiator and the responder may include, in Capability information 401 and 402, bits respectively indicating whether or not SISO BRP TXSS (FIG. 4) is supported, whether or not MIMO BRP TXSS (FIG. 5) is supported, whether or not the SISO Feedback procedure (FIG. 6) is supported, and whether or not MU-MIMO BFT (FIG. 8) in which Initiator TXSS is omitted is supported.

When the Capability information notifies the initiator and the responder that the initiator and the responder support SU-MIMO, the initiator and the responder perform SISO BFT while carrying out TXSS 811a, and measure and retain combinations of transmission and reception antennas and AWVs used for SU-MIMO BFT and the value of SNR for each of the combinations as a result of TXSS training for MIMO.

The initiator and the responder include the retained result of TXSS training for MIMO in Feedback BRP frames 812 and 813 and transmit the Feedback BRP frames, so that SU-MIMO BFT can be carried out correctly.

The initiator and responder may perform TXSS 811a prior to transmitting Capability information 401 and 402. Accordingly, when the initiator carries out TXSS 811a after transmissions of Capability information 401 and Capability information 402, the initiator may transmit Feedback BRP frame 812 to start the SISO Feedback procedure.

Before performing TXSS 811a with the responder, the initiator transmits, to the responder, the Capability information including information indicating whether or not each of SU-MIMO and MU-MIMO is to be supported. Accordingly, the responder can retain the result of TXSS training for MIMO while TXSS 811a is being carried out, and can include the result of TXSS training for MIMO in Feedback BRP frame 813.

Note that, when receiving the BRP frame, the responder may respond thereto using the format of common Feedback BRP frame 981 instead of performing a response (Setup BRP frame 602, Setup BRP frame 701, Setup BRP frame 802, Feedback BRP frame 813, or Feedback BRP frame 912) in accordance with the intention of the received BRP frame received using the flowchart of FIG. 12.

Figure 15:
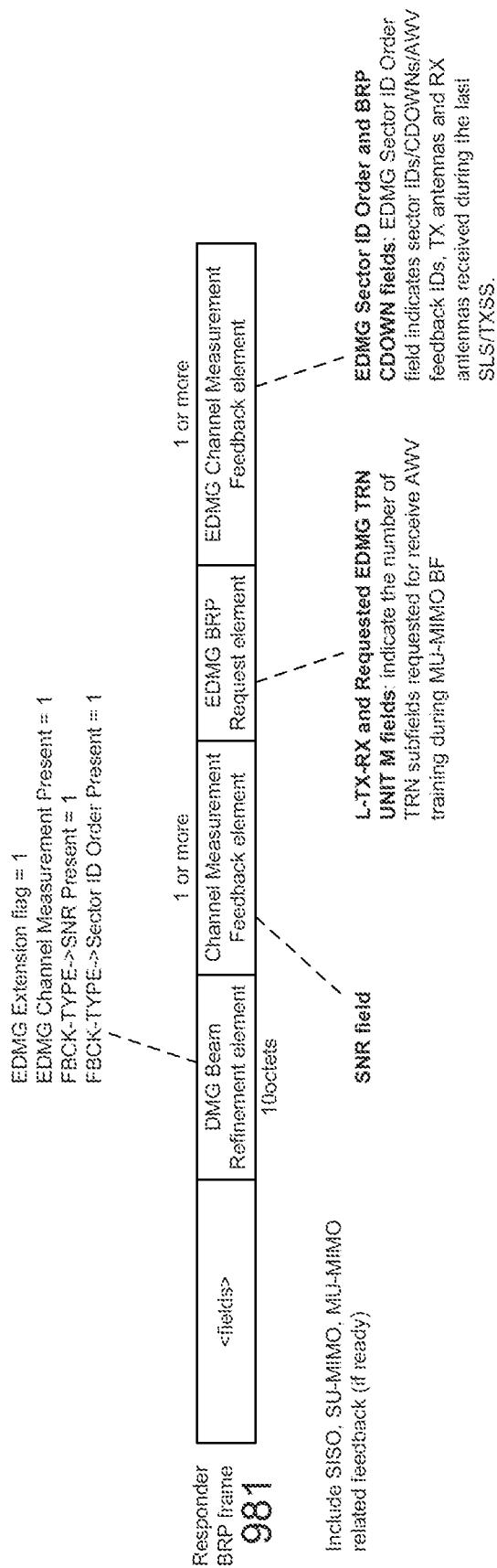
FIG. 15 illustrates a format of a common Feedback BRP frame.

FIG. 15 illustrates a format of common Feedback BRP frame 981. The responder includes the 10-octet DMG Beam Refinement element, Channel Measurement Feedback element, EDMG BRP Request element, and EDMG Channel Measurement Feedback element in BRP frame 981.

The responder sets the value of EDMG Extension Flag field of DMG Beam Refinement element of BRP frame 981 to 1, the value of EDMG Channel Measurement Present field to 1, and the values of SNR Present subfield and Sector ID Order Present subfield of FBCK-TYPE field to 1.

When the responder supports SU-MIMO or MU-MIMO, the responder feeds back, in the EDMG Sector ID Order field of the EDMG Channel Measurement Feedback element, a plurality of AWVs for each combination of transmission antennas of the initiator and reception antennas of the responder. When the number of AWVs in each of the combinations of the transmission and reception antennas is less than or equal to 16, the initiator selects all the AWVs to include the AWVs in the EDMG Sector ID Order field, and when the number of AWVs is greater than 16, the initiator 16 AWVs (e.g., 16 AWVs of high reception quality) to include the AWVs in the EDMG Sector ID Order field. This information is used as essential information in SU-MIMO BFT and MU-MIMO BFT, but may be used for SISO BFT.

The responder includes the SNR value for each of the AWVs in the SNR field of the Channel Measurement Feedback element.

The responder includes, in an L-RX field and the Requested EDMG TRN UNIT M field of the EDMG BRP Request element, information on the number of reception AWVs for which training is performed when the responder receives EDMG BRP-RX frame 705 of SISO BRP TXSS.

When the responder supports MU-MIMO, the responder includes, in the L-TX-RX field and the Requested EDMG TRN UNIT M field of the EDMG BRP Request element, the information on the number of reception AWVs for which training is performed in the MIMO phase of MU-MIMO BFT.

As described above, the responder responds, using common Feedback BRP frame 981, to the first BRP frame transmitted by the initiator, so that an appropriate response can be made, whichever one of SISO BFT, SU-MIMO BFT, and MU-MIMO BFT the initiator intends.

Embodiment 2

Communication apparatus 100 includes, in the BRP frame to be transmitted first, a field indicating the type of SISO, SU-MIMO, or MU-MIMO depending on the type of the BFT procedure to be carried out using the BRP frame (FIG. 3, 4, 5, 6, 7, or 8) and transmits the BRP frame. The responder can distinguish the type of the BFT procedure (FIG. 3, 4, 5, 6, 7, or 8) based on a combination of the field indicating the type and the other fields.

Figure 16:
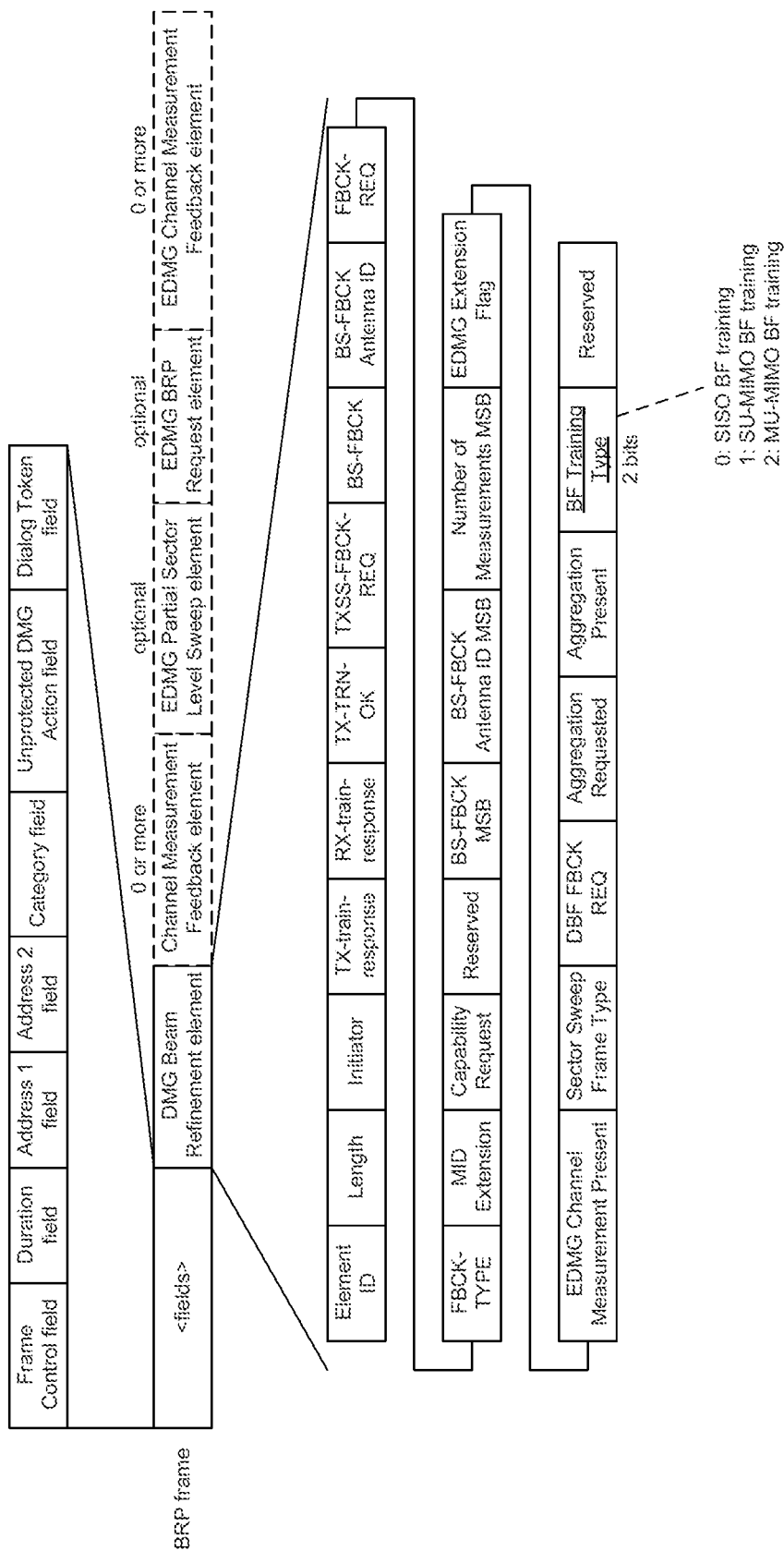
FIG. 16 illustrates a format of a BRP frame of Embodiment 2.

FIG. 16 illustrates a format of a BRP frame of Embodiment 2. Unlike the BRP frame of FIG. 9, the DMG Beam Refinement element includes a BF Training Type field. The value of 0 of the BF Training Type field indicates SISO, the value of 1 indicates SU-MIMO, and the value of 2 indicates MU-MIMO. The value of 3 is a reserved value.

When performing the Setup subphase (FIG. 3) of SISO BRP, the initiator sets the value of the BF Training Type field of BRP frame 601 to 0 (SISO).

When performing SISO BRP TXSS (FIG. 4), the initiator sets the value of the BF Training Type field of Setup BRP frame 701 to 0 (SISO).

When performing MIMO BRP TXSS (FIG. 5), the initiator sets the value of the BF Training Type field of Setup BRP frame 801 to 1 (SU-MIMO).

When performing the SISO Feedback procedure of SU-MIMO (FIG. 6), the initiator sets the value of the BF Training Type field of Feedback BRP frame 812 to 1 (SU-MIMO).

When performing the SISO Feedback subphase (FIG. 8) of MU-MIMO, the initiator sets the value of the BF Training Type field of Poll BRP frame 911*a* to 2 (MU-MIMO).

Figure 17:
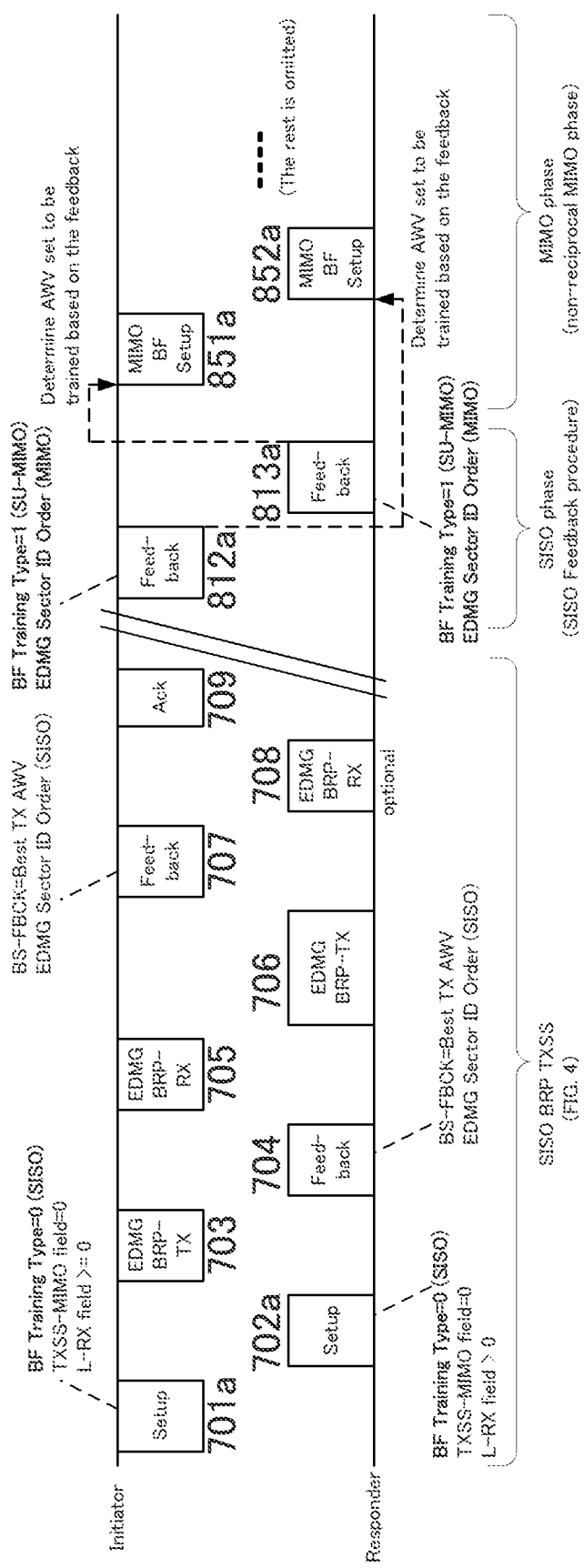
FIG. 17 illustrates a procedure for the initiator and the responder to perform SISO BRP TXSS and SU-MIMO BFT using the BRP frame of FIG. 16.

FIG. 17 illustrates a procedure for the initiator and the responder to perform SISO BRP TXSS and SU-MIMO BFT using the BRP frame of FIG. 16. The same BRP frames as those in FIGS. 4 and 14 are provided with the same reference numerals, and the description thereof is omitted.

The initiator sets the BF Training Type field of Setup BRP frame 701*a* to 0 and transmits the Setup BRP frame in order to perform SISO BRP TXSS.

The responder sets the BF Training Type field of Setup BRP frame 702*a* to 0 and transmits the Setup BRP frame to the initiator in order to respond to the initiator that SISO BRP TXSS can be carried out.

When SISO BRP TXSS is completed, the initiator sets the BF Training Type field of Feedback BRP frame 812*a* to 1 and transmits the Feedback BRP frame in order to perform the SISO Feedback procedure of SU-MIMO.

The responder sets the BF Training Type field of Feedback BRP frame 813*a* to 1 and transmits the Feedback BRP frame in order to respond to the initiator that the SISO Feedback procedure can be carried out.

Figure 18:
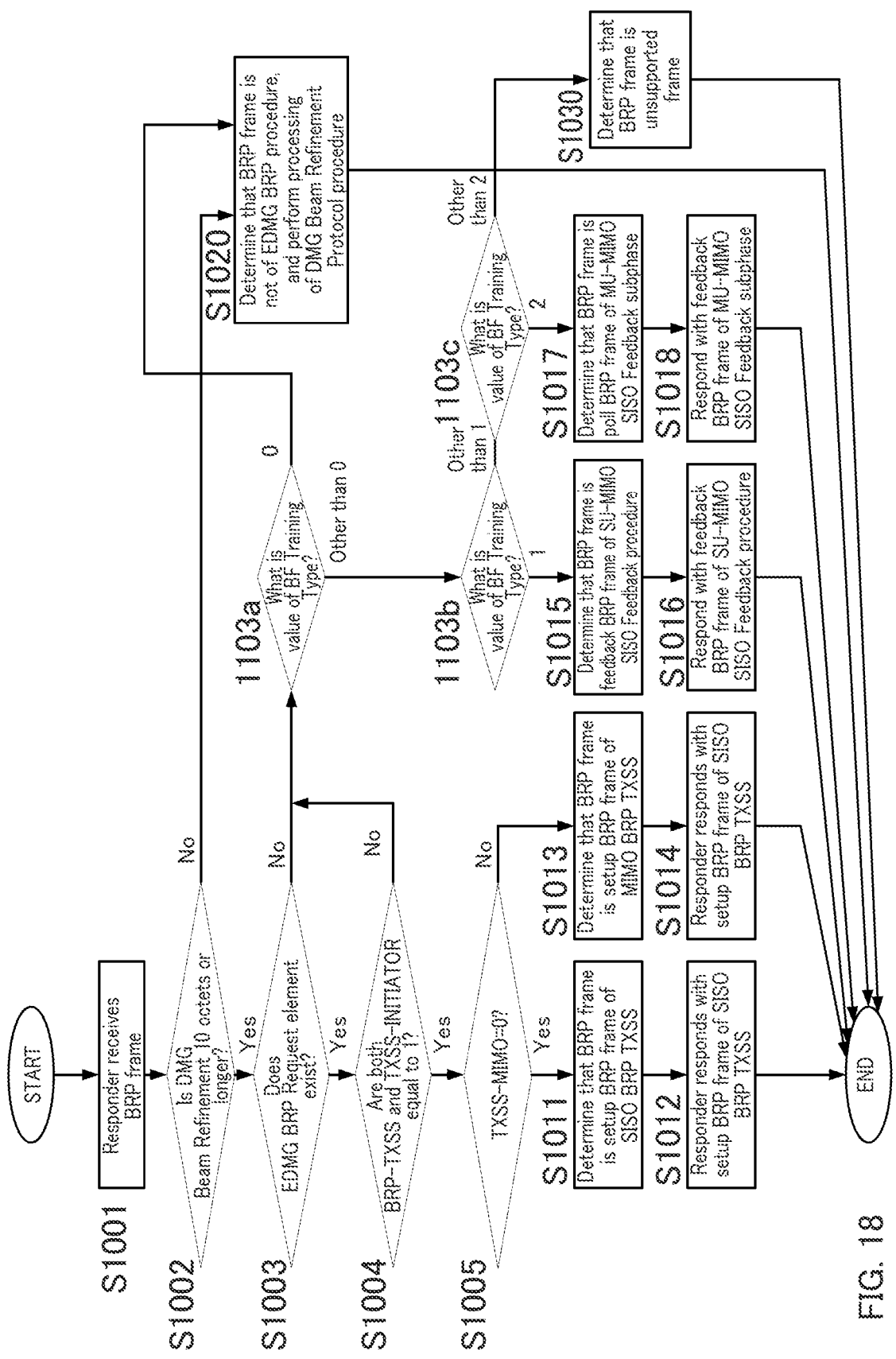
FIG. 18 is a flowchart illustrating a procedure for distinguishing the type of the BFT procedure (FIG. 3, 4, 5, 6, 7, or 8) when the responder receives the BRP frame of FIG. 16.

FIG. 18 is a flowchart illustrating a procedure for distinguishing the type of the BFT procedure (FIG. 3, 4, 5, 6, 7, or 8) when the responder receives the BRP frame of FIG. 16. The same processes as those in FIG. 12 are provided with the same reference numerals, and the description thereof is omitted.

In the case of No at step S1003 or step S1004, the responder proceeds to step S1103*a*.

At step S1103*a*, the responder proceeds to step S1020 when the value of the BF Training Type field is 0. In this case, the responder determines that the received BRP frame is a BRP frame for SISO BFT, but not for SISO BRP TXSS or MIMO BRP TXSS.

At step S1103*a*, the responder proceeds to step S1103*b* when the value of the BF Training Type field is other than 0.

At step S1103*b*, when the value of the BF Training Type field is 1, the responder proceeds to step S1015. In this case, the responder determines that the received BRP frame is a BRP frame that is for SU-MIMO and that notifies of the start of the SISO Feedback procedure.

At step S1103*b*, the responder proceeds to step S1103*c* when the value of the BF Training Type field is other than 1.

At step S1103*c*, the responder proceeds to step S1017 when the value of the BF Training Type field is 2. In this case, the responder determines that the received BRP frame is a BRP frame that is for MU-MIMO and that notifies of the start of SISO Feedback Subphase.

At step S1103*c*, the responder proceeds to step S1030 when the value of the BF Training Type field is other than 2. In this case, the responder determines that the received BRP frame is a frame notifying of the start of an unsupported procedure (for example, part of a future extended flay standard).

When starting SISO BFT, BFT, or MU-MIMO BFT using the BRP frame, the initiator includes the BF Training Type field in the BRP frame and transmits the BRP frame. The responder distinguishes the type of the BFT procedure by using the procedure of FIG. 18. The responder can distinguish the type of the BFT procedure (FIG. 3, 4, 5, 6, 7, or 8), so that it is possible to combine different types of BFT procedures to carry out BFT so as to shorten the time taken to carry out BFT.

When using the format of the BRP frame of FIG. 16 at the start of the BRP procedure, the initiator may include an optional (dispensable) element in the BRP frame and transmit the BRP frame unlike the case where the frame format of one of FIGS. 10A to 10D is used. By way of example, the initiator may include the Channel Measurement Feedback element and the EDMG Channel Measurement Feedback element in Setup BRP frame 701 of SISO BRP TXSS, and may include combinations of transmission and reception antennas and AWVs and the information on SNRs to be transmitted in the SISO Feedback procedure of SU-MIMO. Thus, the initiator can omit the SISO Feedback procedure of SU-MIMO BFT and start the MIMO phase after completing SISO BRP TXSS, so as to reduce the time taken to carry out SU-MIMO BFT.

Further, the responder distinguishes the type of BFT by using the procedure of FIG. 18. Thus, the type of BFT can be correctly distinguished even when an optional (dispensable) element is included in the BRP frame transmitted from the initiator first at the start of the BRP procedure, so that SISO BRP TXSS can be correctly carried out when the Channel Measurement Feedback element and the EDMG Channel Measurement Feedback element are included in Setup BRP frame 701 of SISO BRP TXSS as described above.

Note that, in the BRP frame format of FIG. 16, the initiator may set the value of the BF Training Type field to 0 when performing SISO BRP TXSS (FIG. 4) or MIMO BRP TXSS (FIG. 5), set the value of the BF Training Type field to 1 when performing the SISO Feedback Procedure of SU-MIMO BFT, and set the value of the BF Training Type field to 2 when performing the SISO Feedback subphase of MU-MIMO BFT.

Figure 19:
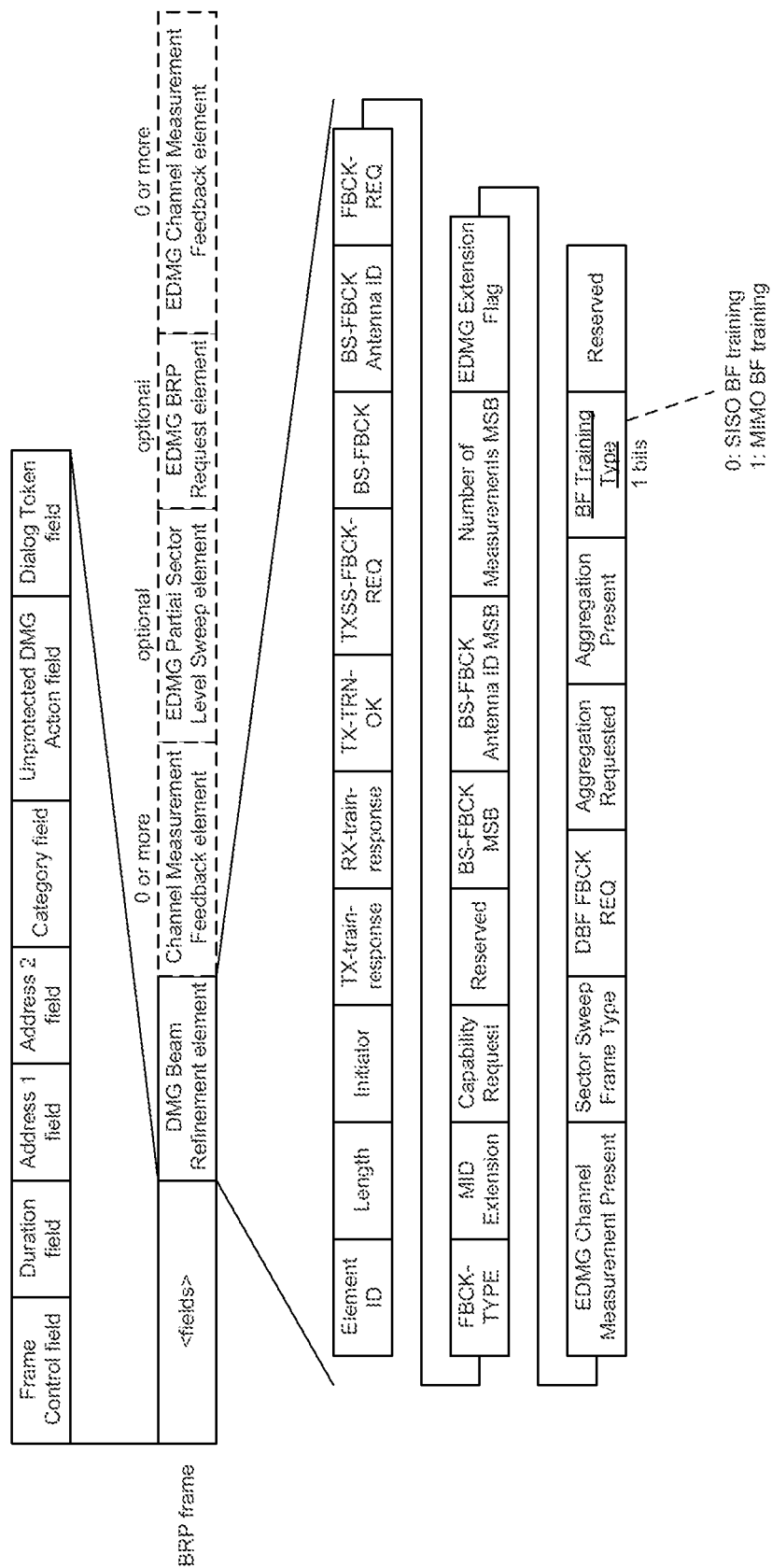
FIG. 19 illustrates an example of a format of the BRP frame other than that illustrated in FIG. 16.

FIG. 19 illustrates an example of a format of the BRP frame other than that illustrated in FIG. 16. Unlike FIG. 16, the BF Training Type field has one bit.

The initiator sets the value of the BF Training Type field to 0 when performing SISO BFT (MIMO BRP TXSS of FIG. 3, 4 or 5). When MIMO BFT (FIG. 6, 7, or 8) is performed, the value of the BF Training Type field is set to 1.

Note that, while a description is given of a case where MIMO BRP TXSS of FIG. 5 is regarded as SISO BFT and the value of the BF Training Type field is set to 0, the same description applies to a case where MIMO BRP TXSS is regarded as MIMO BFT and the value of the BF Training Type field is set to 1.

Figure 20:
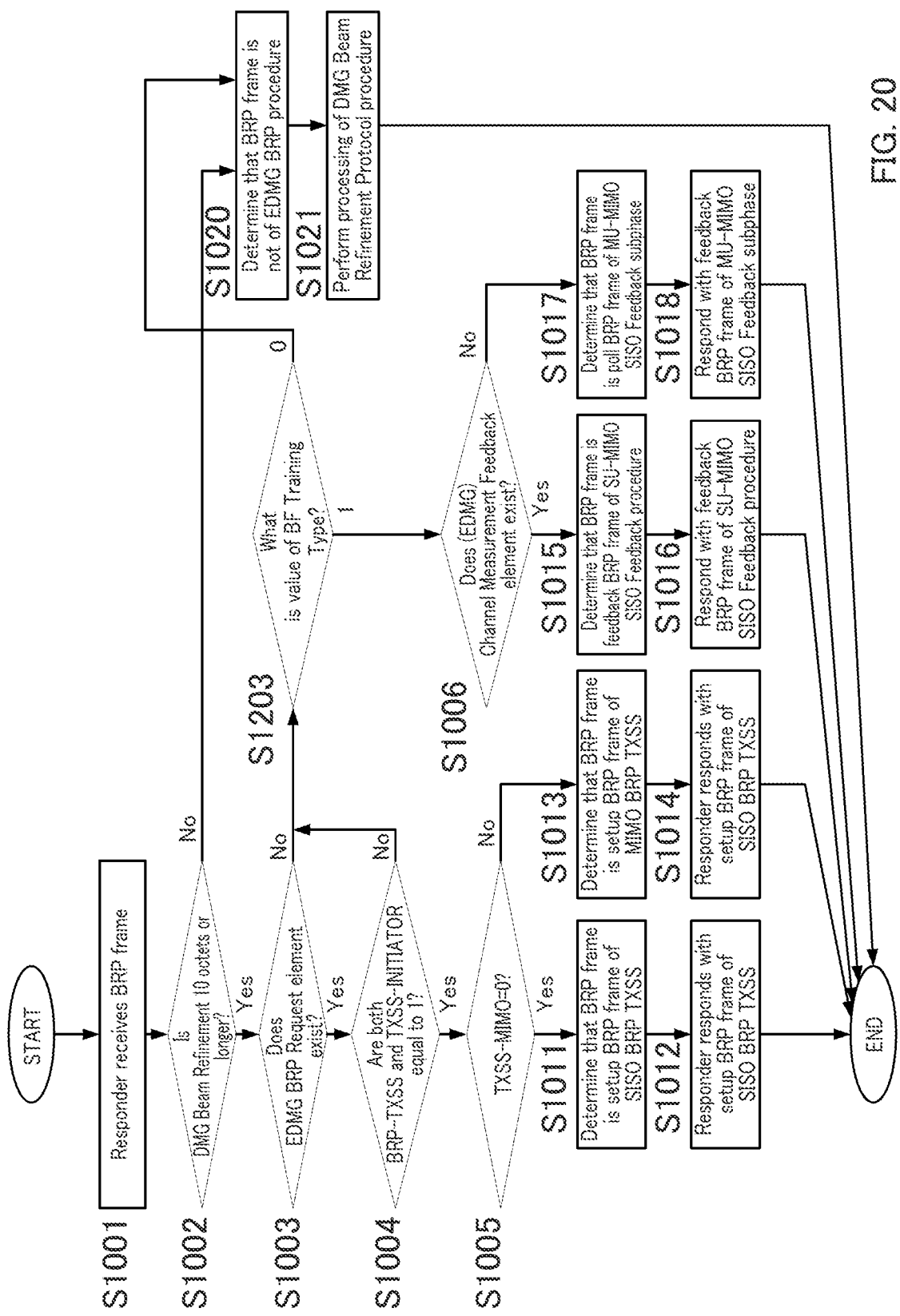
FIG. 20 is a flowchart illustrating a procedure for distinguishing the type of the BFT procedure (FIG. 3, 4, 5, 6, 7, or 8) when the responder receives the BRP frame of FIG. 19.

FIG. 20 is a flowchart illustrating a procedure for distinguishing the type of the BFT procedure (FIG. 3, 4, 5, 6, 7, or 8) when the responder receives the BRP frame of FIG. 19. The same processes as those in FIG. 12 are provided with the same reference numerals, and the description thereof is omitted.

In the case of No at step S1003 or step S1004, the responder proceeds to step S1203.

At step S1203, the responder proceeds to step S1020 when the value of the BF Training Type field is 0. In this case, the responder determines that the received BRP frame is a BRP frame for SISO BFT, but not for SISO BRP TXSS and MIMO BRP TXSS.

At step S1203, the responder proceeds to step S1006 when the value of the BF Training Type field is 1. In this case, the responder determines that the received BRP frame is a BRP frame for SU-MIMO BFT or MU-MIMO BFT. The processing of the responder at step S1006 is the same as that in FIG. 12.

Note that, in the BRP frame format of FIG. 19, the initiator may set the value of the BF Training Type field to 1 when performing the SISO Feedback Procedure of SU-MIMO BFT or the SISO Feedback subphase of MU-MIMO BFT, or may otherwise set the value of the BF Training Type field to 0.

Note also that, in the BRP frame format of FIG. 19, the initiator may set the value of the BF Training Type field to 1 when performing the SISO Feedback subphase of MU-MIMO BFT, or may otherwise set the value of the BF Training Type field to 0. As with S1003 of FIG. 12 and instead of determining whether or not the value of BF Training Type is 0 at step S1203 of FIG. 20, the responder may proceed to step S1020*b* when the EDMG BRP Request element exists and to step S1006 when the EDMG BRP Request element does not exist, and at step S1006, the responder may proceed to step S1015 when the value of the BF Training Type field is 0 and to step S1017 when the value of the BF Training Type field is 1.

When starting SISO BFT, BFT, or MU-MIMO BFT using the BRP frame, the initiator includes the BF Training Type field in the BRP frame and transmits the BRP frame. The responder distinguishes the type of the BFT procedure by using the procedure of FIG. 18. The responder can distinguish the type of the BFT procedure (FIG. 3, 4, 5, 6, 7, or 8), so that it is possible to combine different types of BFT procedures to carry out BFT so as to shorten the time taken to carry out BFT.

The initiator uses the BRP frame of FIG. 19 instead of the BRP frame of FIG. 16 first in the BRP procedure. Accordingly, the number of bits of the BF Training Type field may be smaller and a larger number of Reserved bits can be left, so that the BRP frame of FIG. 19 is easy to be functionally extended in the future.

Embodiment 3

Communication apparatus 100 uses the feedback value transmitted in the SISO phase of SU-MIMO BFT (see FIG. 6) for Beam Refinement Transaction of SISO BFT. The Setup subphase in BRP for SISO training (see FIG. 3) can be omitted and training can thus be completed early.

Figure 21:
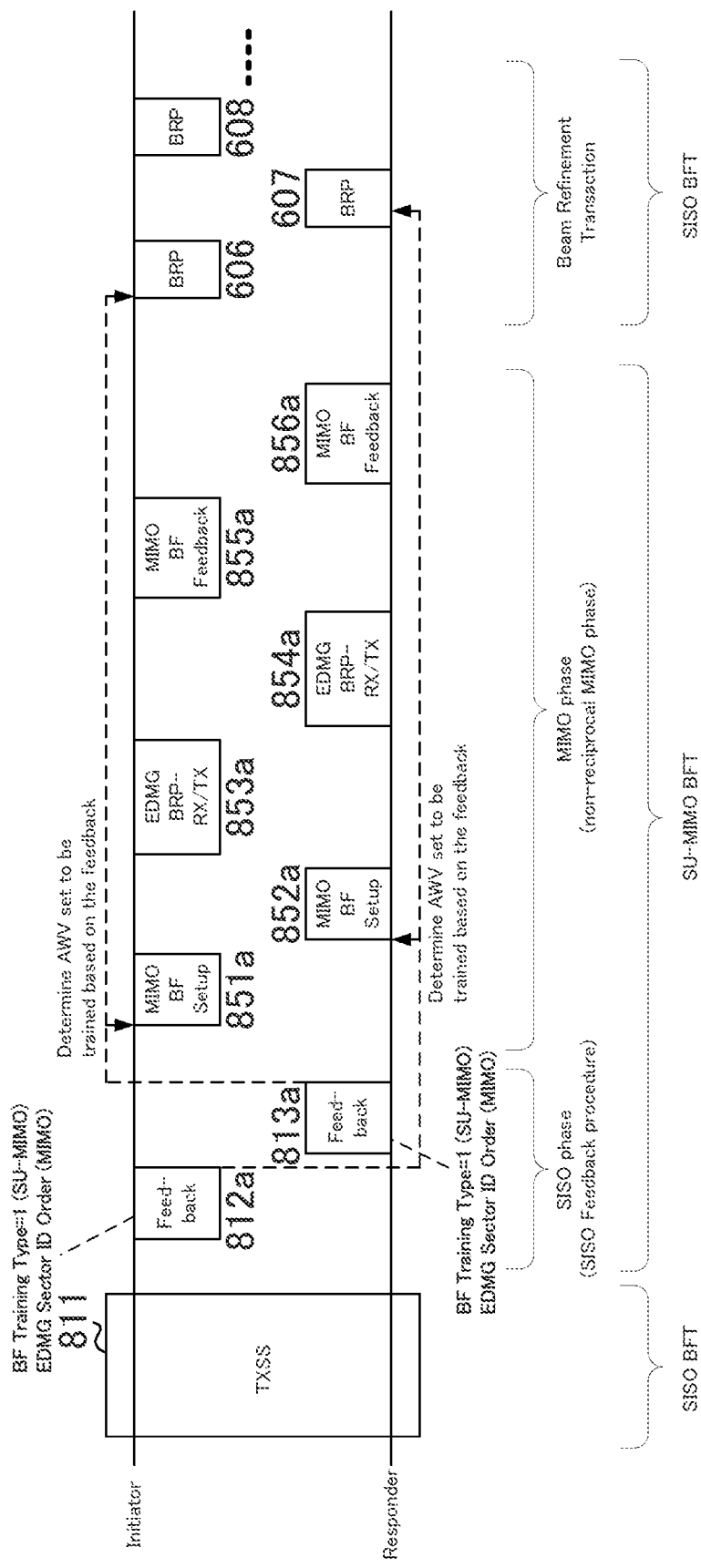
FIG. 21 illustrates an example of a procedure for the initiator and the responder to perform SISO BFT and SU-MIMO BFT.

FIG. 21 illustrates an example of a procedure for the initiator and the responder to perform SISO BFT and SU-MIMO BFT. The same BRP frames as those in FIGS. 4, 6, and/or 17 are provided with the same reference numerals, and the description thereof is omitted.

The initiator and the responder perform SISO BFT (TXSS 811) and SU-MIMO BFT (including the SISO Feedback procedure and MIMO phase) as in FIG. 6. Note that, the initiator may use the BRP frames of FIGS. 10A to 10D, 16, and/or 19 in the SISO Feedback procedure.

After completing SU-MIMO BFT, the initiator carries out Beam Refinement Transaction (BRP frames 606, 607, and 608).

When carrying out Beam Refinement Transaction, the initiator and the responder refer to the values of the Channel Measurement Feedback element and EDMG Channel Measurement Feedback field included in Feedback BRP frames 812*a* and 813*a* (the values of the EDMG Sector ID Order field and the SNR field) so as to determine the AWV with which Beam Refinement Transaction is to be performed. Accordingly, the initiator and the responder can omit the Setup subphase of SISO BRP (see FIG. 3) prior to performing Beam Refinement Transaction.

The initiator and the responder complete Beam Refinement Transaction to complete SISO BFT.

The procedure of FIG. 21 makes it possible for the initiator and the responder to carry out SISO BFT and SU-MIMO BFT combined with each other, and to omit the Setup subphase of SISO BRP to reduce the time taken to carry out both SISO BFT and SU-MIMO BFT.

Modification 1 of Embodiment 3

Communication apparatuses 100 use the feedback value transmitted in the SISO phase of SU-MIMO BFT (see FIG.

6) for Beam Refinement Transaction of SISO BFT, and insert and carry out SISO BFT (Beam Refinement Transaction) between the SISO phase and the MIMO phase. The Setup subphase in BRP for SISO training (see FIG. 3) can be omitted and training can be thus completed early.

Figure 22:
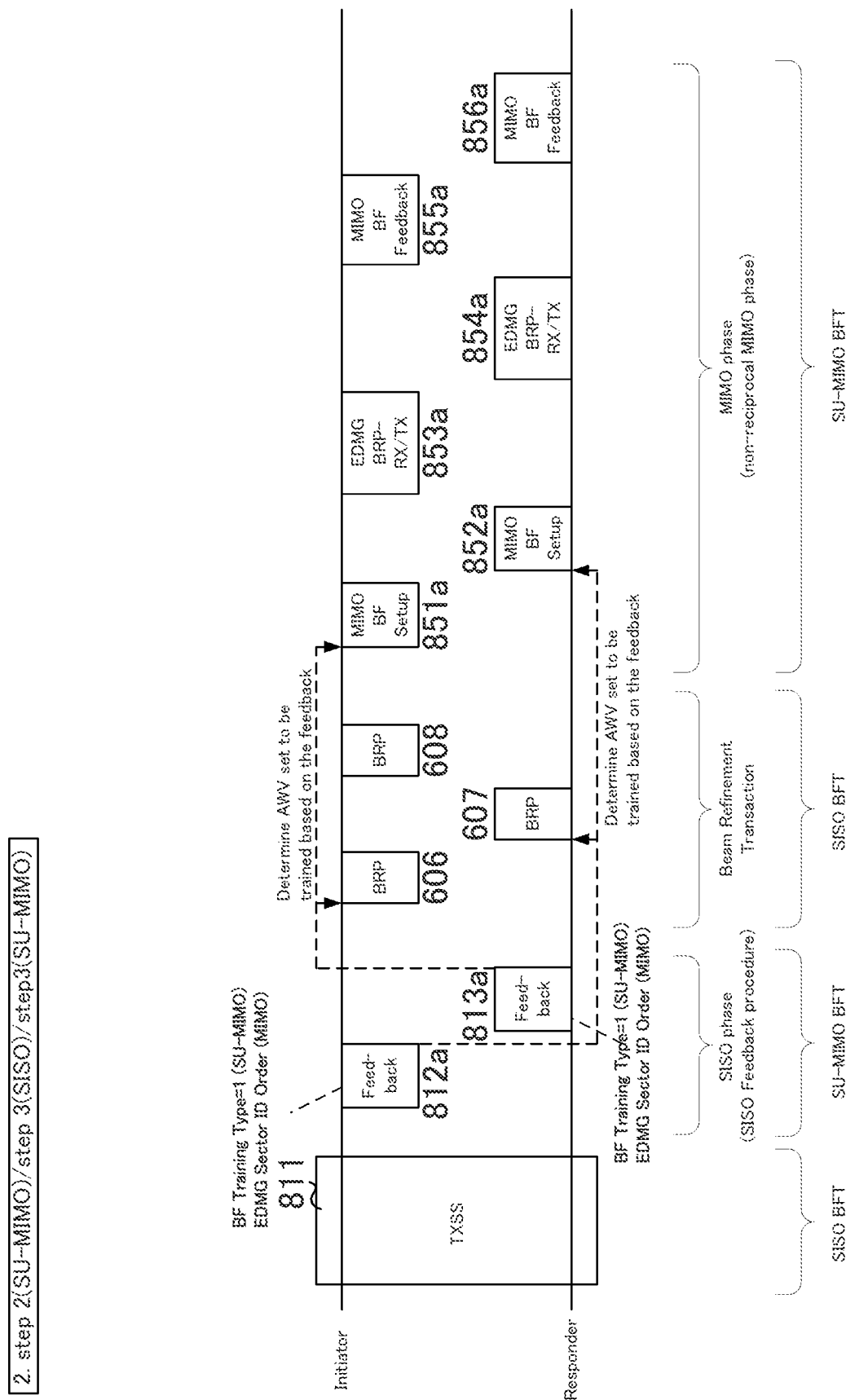
FIG. 22 illustrates an example of the procedure for the initiator and the responder to perform SISO BFT and SU-MIMO BFT.

FIG. 22 illustrates an example of a procedure for the initiator and the responder to perform SISO BFT and SU-MIMO BFT. The same BRP frames as those in FIGS. 4, 6, and/or 17 are provided with the same reference numerals, and the description thereof is omitted.

The initiator and the responder perform SISO BFT (TXSS 811) and SU-MIMO BFT (the SISO Feedback procedure) as in FIG. 6. Note that, the initiator may use the BRP frames of FIGS. 10A to 10D, 16, and/or 19 in the SISO Feedback procedure.

After the SISO Feedback procedure is completed, the initiator starts Beam Refinement Transaction of SISO BRP. When carrying out Beam Refinement Transaction, the initiator and the responder refer to the values of the Channel Measurement Feedback element and EDMG Channel Measurement Feedback field included in Feedback BRP frames 812a and 813a (the values of the EDMG Sector ID Order field and the SNR field) so as to determine the AWV with which Beam Refinement Transaction is to be performed. Accordingly, the initiator and the responder can omit the Setup subphase of SISO BRP (see FIG. 3) prior to performing Beam Refinement Transaction.

The initiator starts the MIMO phase after Beam Refinement Transaction is completed. The initiator and the responder can omit the SISO Feedback procedure since the SISO Feedback procedure has been completed.

The procedure of FIG. 22 makes it possible for the initiator and the responder to carry out SISO BFT in combination with SU-MIMO BFT, and to omit the Setup subphase of SISO BRP to reduce the time taken to carry out both SISO BFT and SU-MIMO BFT.

Modification 2 of Embodiment 3

Communication apparatuses 100 update the best sector of SISO during MIMO BRP TXSS of FIG. 5. This is called SISO/MIMO BRP TXSS. The SISO training can be omitted and training can be completed early.

Figure 23:
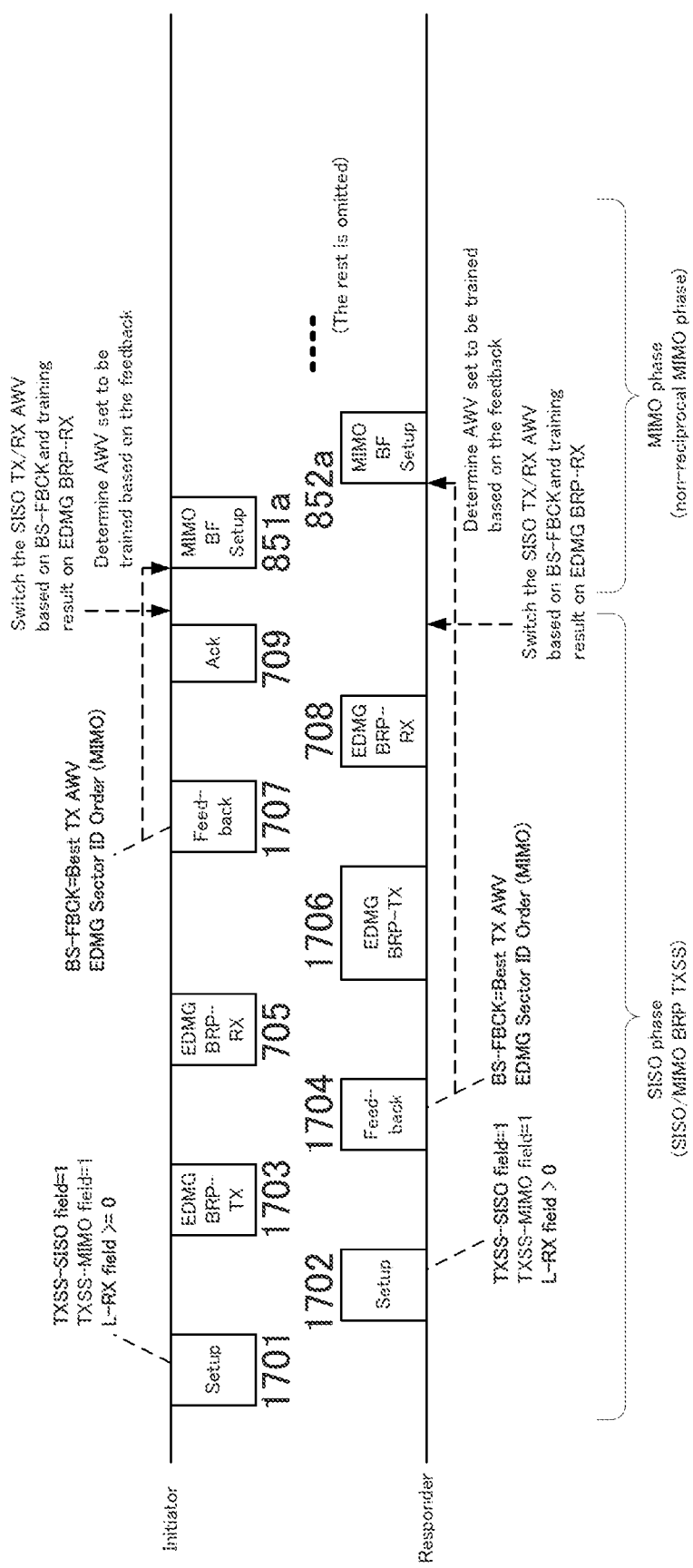
FIG. 23 illustrates an example of the procedure for the initiator and the responder to perform SISO BFT and SU-MIMO BFT.

FIG. 23 illustrates an example of a procedure for the initiator and the responder to perform SISO BFT and SU-MIMO BFT. The same BRP frames as those in FIGS. 4 and 5 are provided with the same reference numerals, and the description thereof is omitted.

The initiator transmits Setup BRP frame 1701.

Figure 24:
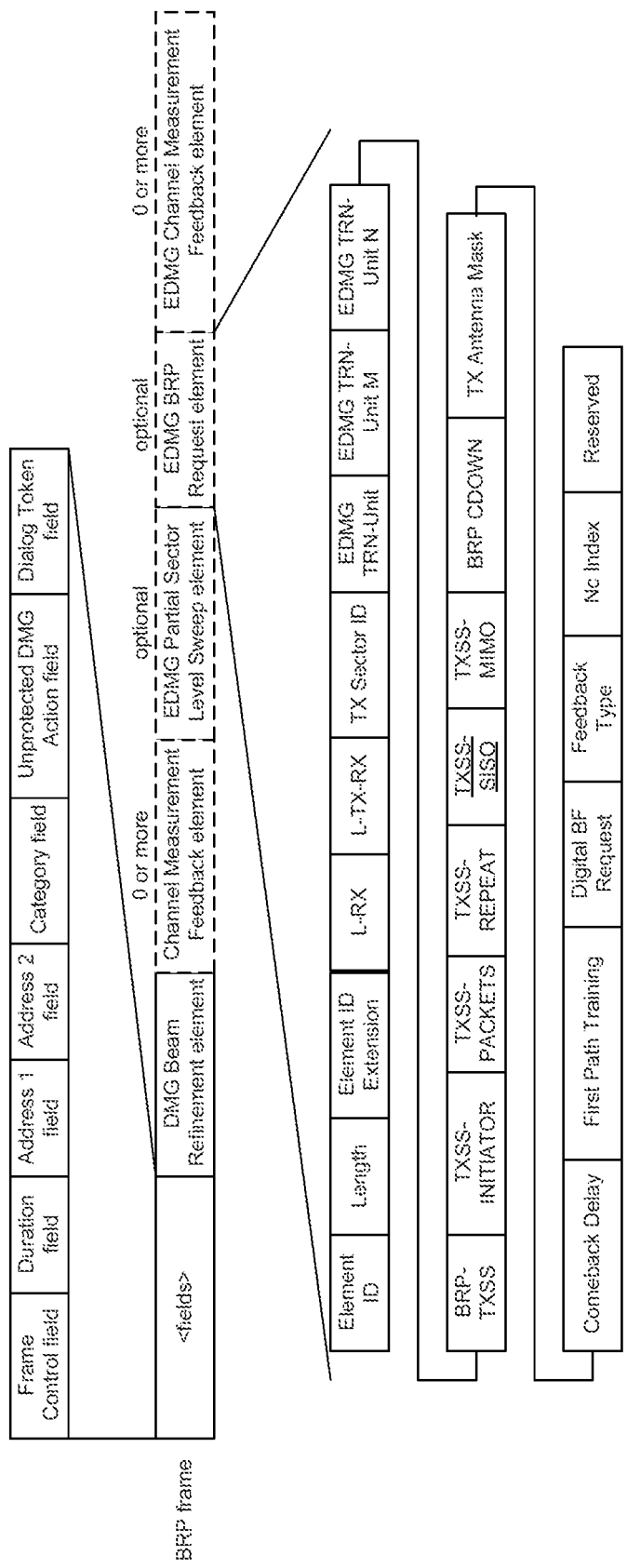
FIG. 24 illustrates a format of the BRP frame.

FIG. 24 illustrates the format of BRP frame 1701. BRP frame 1701 includes a TXSS-SISO field and a TXSS-MIMO field. When performing the BFT procedure of FIG. 23, the initiator transmits Setup BRP frame 1701 in which the TXSS-SISO field is set to 1 and the TXSS-MIMO field is set to 1. The initiator may also transmit Setup BRP frame 1701 including information on training for reception AWV (e.g., setting the number of reception AWVs in the L-RX field).

When the responder receives Setup BRP frame 1701, the responder transmits Setup BRP frame 1702 in which the TXSS-SISO field is set to 1 and the TXSS-MIMO field is set to 1.

The initiator and responder transmit EDMG BRP-TX frames 1703 and 1706. While EDMG BRP-TX frames 1703 and 1706 are similar to EDMG BRP-TX frames 703 and 706 and EDMG BRP-TX frames 803 and 805, the initiator and responder perform the same processing as in SISO BFT and the SISO phase of SU-MIMO BFT when receiving EDMG BRP-TX frames 1706 and 1703. In other words, the best sectors necessary for SISO BFT are selected and a list of AWVs necessary for MIMO BFT is kept.

The initiator and responder transmit Feedback BRP frames 1704 and 1707. Each of Feedback BRP frames 1704 and 1707 includes both the information on the best sector corresponding to the result of SISO BFT (which is included e.g., in the BS-FBCK field) and the feedback in the SISO phase of SU-MIMO BFT (e.g., the values of the EDMG Sector ID Order field and the SNR field included in the Channel Measurement Feedback element, and/or the EDMG Channel Measurement Feedback element).

The initiator and responder may perform training for the reception AWVs in SISO as in FIG. 4 using EDMG BRP-RX frames 705 and 708.

After completing SISO/MIMO BRP TXSS, the initiator transmits MIMO BF Setup BRP frame 851a to perform the MIMO phase.

Note that, when the initiator performs SISO BRP TXSS (FIG. 4), the initiator may use the format illustrated in FIG. 24 for Setup BRP frame 701 and transmit the Setup BRP frame in which the TXSS-SISO field is set to 1 and the TXSS-MIMO field is set to 0.

Note that, when the initiator performs MIMO BRP TXSS (FIG. 5), the initiator may use the format illustrated in FIG. 24 for Setup BRP frame 801 and transmit the Setup BRP frame in which the TXSS-SISO field is set to 0 and the TXSS-MIMO field is set to 1.

When the initiator starts the SISO phase of SU-MIMO, the initiator includes the TXSS-SISO field and the TXSS-MIMO field in Setup BRP frame 1701, sets both the fields to 1, and transmits the Setup BRP frame.

Thus, the initiator and the responder can complete SISO BFT and training of the SISO phase of SU-MIMO during the SISO phase of SU-MIMO, so that it is possible to omit to carry out SISO BRP TXSS to reduce the time taken to carry out SISO BFT and SU-MIMO BFT.

The present disclosure can be realized by software, hardware, or software in cooperation with hardware. Each functional block used in the description of each of the embodiments described above can be realized by an LSI as an integrated circuit, and each process described in each of the embodiments may be controlled by the LSI. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing integrated circuits is not limited to LSIs and the integrated circuits may be realized by dedicated circuits or general-purpose processors. In addition, a Field Programmable Gate Array (FPGA) that can be programmed after manufacture of the LSI, or a reconfigurable processor in which the connections and the settings of circuit cells disposed inside the LSI can be reconfigured may be used.

Note that the present disclosure is intended to be variously modified or varied by those skilled in the art based on the description presented in the present specification and known techniques without departing from the content and scope of the present disclosure, and such modifications and applications are encompassed within the scope of the claimed protection. Further, any combination of features of the above-mentioned embodiments may be made without departing from the content of the present disclosure.

A first general aspect of the present disclosure provides a communication method in which an initiator transmits a first feedback frame to a responder, the first feedback frame including a BF training type FIELD indicating whether or not beamforming training (BFT) for Single User Multi-Input Multi-Output (SU-MIMO) is performed after transmission sector sweep (TXSS) ends; a responder receives the first feedback frame, and transmits second feedback frame to the initiator when the BF training type FIELD indicates that the BFT for SU-MIMO is performed, the second feedback frame including a Signal to Noise Ratio (SNR) and a sector Identifier (ID) order based on a result of the TXSS; and the initiator receives the second feedback frame, and performs the BFT for SU-MIMO between the initiator and the responder based on the SNR and the sector ID order.

A second general aspect of the present disclosure provides a communication method for an initiator, the method including: transmitting a feedback frame to a responder, the feedback frame including a BF training type FIELD indicating whether or not BFT for SU-MIMO is performed after TXSS ends; and when second feedback frame including an SNR and a sector ID order based on a result of the TXSS is received from the responder, performing the BFT for SU-MIMO between the initiator and the responder based on the SNR and the sector ID order.

A third general aspect of the present disclosure provides a communication method for a responder, the method including: receiving a first feedback frame from an initiator, the first feedback frame including a BF training type FIELD indicating whether or not beamforming training (BFT) for Single User Multi-Input Multi-Output (SU-MIMO) is performed after transmission sector sweep (TXSS) ends; transmitting second feedback frame to the initiator when the BF training type FIELD indicates that the BFT for SU-MIMO is performed, the second feedback frame including a Signal to Noise Ratio (SNR) and a sector Identifier (ID) order based on a result of the TXSS; and performing the BFT for SU-MIMO between the initiator and the responder based on the SNR and the sector ID order.

A fourth general aspect of the present disclosure provides an initiator communication apparatus in which a MAC circuit generates a first feedback frame including a BF training type FIELD indicating whether or not BFT for SU-MIMO is performed after TXSS ends; a transmission circuit transmits the first feedback frame to a responder; a reception circuit receives second feedback frame from the responder; and when the second feedback frame includes an SNR and a sector ID order based on a result of the TXSS from the responder, the MAC circuit performs BFT with the responder using the transmission circuit and the reception circuit based on the SNR and the sector ID order.

A fifth general aspect of the present disclosure provides a responder communication apparatus in which a reception circuit receives a first feedback frame from an initiator, the first feedback frame including a BF training type FIELD indicating whether or not beamforming training (BFT) for Single User Multi-Input Multi-Output (SU-MIMO) is performed after transmission sector sweep (TXSS) ends; a MAC circuit generates second feedback frame when the BF training type FIELD indicates that the BFT for SU-MIMO is performed, the second feedback frame including a Signal to Noise Ratio (SNR) and a sector Identifier (ID) order based on a result of the TXSS; a transmission circuit transmits the second feedback frame to the initiator; and after the transmission circuit transmits the second feedback frame to the initiator, the MAC circuit performs the BFT for SU-MIMO between the responder and the initiator using the transmission circuit and the reception circuit based on the SNR and the sector ID order.

The disclosures of U.S. Patent Application No. 62/661,538 filed on Apr. 23, 2018 and Japanese Patent Application No. 2019-078100 filed on Apr. 16, 2019 including the specifications, drawings and abstracts are incorporated herein by reference in their entirety.

INDUSTRIAL APPLICABILITY

The present disclosure is suitable as a communication apparatus conforming to the 802.11ad standard.

REFERENCE SIGNS LIST

100, 200, 300 Communication apparatus
101a, 101b, 201a, 201b, 301a, 301b Antenna array (transmission antenna and reception antenna)
102a, 102b Switch circuit (SW)
103a, 103b Transmission Radio Frequency (RF) circuit
104a, 104b Reception RF circuit
109, 109a RF module circuit
110, 110a PHY circuit
111a, 111b D/A converter
112a, 112b A/D converter
113 Array control circuit
114 Coding and modulation circuit
115 Demodulation and decoding circuit
120 MAC circuit
121 Access control circuit
122 Frame generation circuit
123 Frame reception circuit
124 Beamforming (BF) control circuit
130 Host
151, 152 Intermediate Frequency (IF) transfer circuit
153 IF cable

The invention claimed is:

1. A Responder apparatus comprising:
a receiver which, in operation, receives a feedback request frame from an Initiator apparatus after a transmission sector sweep (TXSS) is performed, the feedback request frame including a Beamforming (BF) Training Type field in which a value indicating one of single input single output (SISO) BF training, single user MIMO (SU-MIMO) BF training, multi user MIMO (MU-MIMO) BF training, or a reserved value is set, wherein the receiver is capable of receiving a value indicating the SISO BF training, a value indicating the SU-MIMO BF training, a value indicating the multi user MIMO (MU-MIMO) BF training and a value indicating the reserved value;
measurement circuitry which, in operation, measures Signal to Noise Ratio (SNR) of sectors used for reception in the TXSS;
a transmitter which, in operation, transmits a feedback frame to the Initiator apparatus, the feedback frame including a Sector ID Order subfield and an SNR subfield, wherein the Sector ID Order subfield indicates a plurality of sector IDs and a plurality of antennas corresponding to at least a portion of the sectors used for reception in the TXSS, and wherein the SNR subfield indicates SNRs of the sectors; and
control circuitry which, in operation, performs BF training of a type indicated by the BF Training Type field, based on the Sector ID Order subfield and the SNR subfield.

2. The Responder apparatus according to claim 1, wherein the TXSS is performed using one of a Directional Multi Gigabit (DMG) Beacon frame, a Sector Sweep (SSW)

frame, a Short SSW frame and a DMG Beam Refinement Protocol (BRP)-Transmission (TX) frame.

3. The Responder apparatus according to claim 1, wherein the BF Training Type field is set to 0 to indicate SISO BF training, set to 1 to indicate SU-MIMO BF training, and set to 2 to indicate MU-MIMO BF training.

4. The Responder apparatus according to claim 1, wherein the feedback request frame includes a TXSS Feedback Request field that indicate whether a feedback is requested and an SNR Request subfield that indicates whether an SNR feedback is requested.

5. The Responder apparatus according to claim 4, wherein in response the feedback request frame with the BF Training Type field set to 0, the TXSS Feedback Request field set to 1, and the SNR Request subfield set to 1, the feedback frame includes a second BF Training Type field set to 0.

6. The Responder apparatus according to claim 4, wherein in response the feedback request frame with the BF Training Type field set to 1, the TXSS Feedback Request field set to 1, and the SNR Request subfield set to 1, the feedback frame includes a second BF Training Type field set to 1.

7. The Responder apparatus according to claim 4, wherein in response the feedback request frame with the BF Training Type field set to 2, the TXSS Feedback Request field set to 1, and the SNR Request subfield set to 1, the feedback frame includes a second BF Training Type field set to 2.

8. The Responder apparatus according to claim 1, wherein both the feedback request frame and the feedback frame are Beam Refinement Protocol (BRP) frames.

9. The Responder apparatus according to claim 1, wherein the Sector ID Order subfield indicates the plurality of sector IDs and the plurality of antennas regardless of which BF training type is indicated by the BF Training Type field included in the feedback request frame.

10. A communication method for a Responder, the communication method comprising:
   receiving a feedback request frame from an Initiator after a transmission sector sweep (TXSS) is performed, the feedback request frame including a Beamforming (BF) Training Type field in which a value indicating one of single input single output (SISO) BF training, single user MIMO (SU-MIMO) BF training, multi user MIMO (MU-MIMO) BF training, or a reserved value is set, wherein the Responder is capable of receiving a value indicating the SISO BF training, a value indicating the SU-MIMO BF training, a value indicating the multi user MIMO (MU-MIMO) BF training and a value indicating the reserved value;
   measuring Signal to Noise Ratio (SNR) of sectors used for reception in the TXSS;
   transmitting a feedback frame to the Initiator, the feedback frame including a Sector ID Order subfield and an SNR subfield, wherein the Sector ID Order subfield indicates a plurality of sector IDs and a plurality of antennas corresponding to at least a portion of sectors used for reception in the TXSS, and wherein the SNR subfield indicates SNRs of the sectors; and
   performing BF training of a type indicated by the BF Training Type field, based on the Sector ID Order subfield and the SNR subfield.

11. The communication method according to claim 10, wherein the TXSS is performed using one of a Directional Multi Gigabit (DMG) Beacon frame, a Sector Sweep (SSW) frame, a Short SSW frame, and a DMG Beam Refinement Protocol (BRP)-Transmission (TXT frame.

12. The communication method according to claim 10, wherein the BF Training Type field is set to 0 to indicate SISO BF training, set to 1 to indicate SU-MIMO BF training, and set to 2 to indicate MU-MIMO BF training.

13. The communication method according to claim 10, wherein the feedback request frame includes a TXSS Feedback Request field that indicate whether a feedback is requested and an SNR Request subfield that indicates whether an SNR feedback is requested.

14. The communication method according to claim 13, wherein in response the feedback request frame with the BF Training Type field set to 0, the TXSS Feedback Request field set to 1, and the SNR Request subfield set to 1, the feedback frame includes a second BF Training Type field set to 0.

15. The communication method according to claim 13, wherein in response the feedback request frame with the BF Training Type field set to 1, the TXSS Feedback Request field set to 1, and the SNR Request subfield set to 1, the feedback frame includes a second BF Training Type field set to 1.

16. The communication method according to claim 13, wherein in response the feedback request frame with the BF Training Type field set to 2, the TXSS Feedback Request field set to 1, and the SNR Request subfield set to 1, the feedback frame includes a second BF Training Type field set to 2.

17. The communication method according to claim 10, wherein both the feedback request frame and the feedback frame are Beam Refinement Protocol (BRP) frames.

18. The communication method according to claim 10, wherein the Sector ID Order subfield indicates the plurality of sector IDs and the plurality of antennas regardless of which BF training type is indicated by the BF Training Type field included in the feedback request frame.

19. An integrated circuit for a Responder, the integrated circuit comprising:
   at least one input which, in operation, receives an input; and
   control circuitry coupled to the at least one input, the control circuitry which, in operation, controls:
      receiving a feedback request frame from an Initiator after a transmission sector sweep (TXSS) is performed, the feedback request frame including a Beamforming (BF) Training Type field in which a value indicating one of single input single output (SISO) BF training, single user MIMO (SU-MIMO) BF training, multi user MIMO (MU-MIMO) BF training, or a reserved value is set, wherein the Responder is capable of receiving a value indicating the SISO BF training, a value indicating the SU-MIMO BF training, a value indicating the multi user MIMO (MU-MIMO) BF training and a value indicating the reserved value;
      measuring Signal to Noise Ratio (SNR) of sectors used for reception in the TXSS;
      transmitting a feedback frame to the Initiator, the feedback frame including a Sector ID Order subfield and an SNR subfield, wherein the Sector ID Order subfield indicates a plurality of sector IDs and a plurality of antennas corresponding to at least a portion of the sectors used for reception in the TXSS, and wherein the SNR subfield indicates SNRs on the sectors; and
      performing BF training of a type indicated by the BF Training Type field, based on the Sector ID Order subfield and the SNR subfield.

20. The integrated circuit according to claim 19, wherein the Sector ID Order subfield indicates the plurality of sector IDs and the plurality of antennas regardless of which BF training type is indicated by the BF Training Type field included in the feedback request frame.

* * * * *